INVENTORS
J. A. DAVIS
B. A. RAETSCH
BY
A.C. Schwarz, Jr.
ATTORNEY

March 25, 1958 J. M. DAVIS ET AL 2,827,940
APPARATUS FOR ASSEMBLING TERMINALS TO MULTICONDUCTOR CORDS
Filed Feb. 21, 1955 15 Sheets-Sheet 2
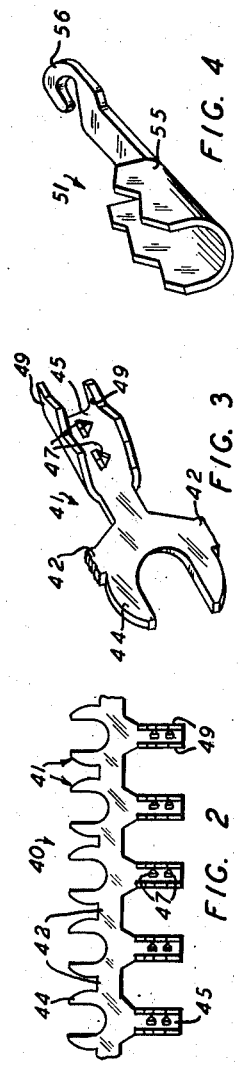
INVENTORS
J. M. DAVIS
B. A. RAETSCH
BY
ATTORNEY

INVENTORS
J. M. DAVIS
B. A. RAETSCH
BY
ATTORNEY

INVENTORS
J. M. DAVIS
B. A. RAETSCH
BY
ATTORNEY

INVENTORS
J. M. DAVIS
B. A. RAETSCH
ATTORNEY

INVENTORS
J. M. DAVIS
B. A. RAETSCH
BY
ATTORNEY

March 25, 1958 J. M. DAVIS ET AL 2,827,940
APPARATUS FOR ASSEMBLING TERMINALS TO MULTICONDUCTOR CORDS
Filed Feb. 21, 1955 15 Sheets-Sheet 9
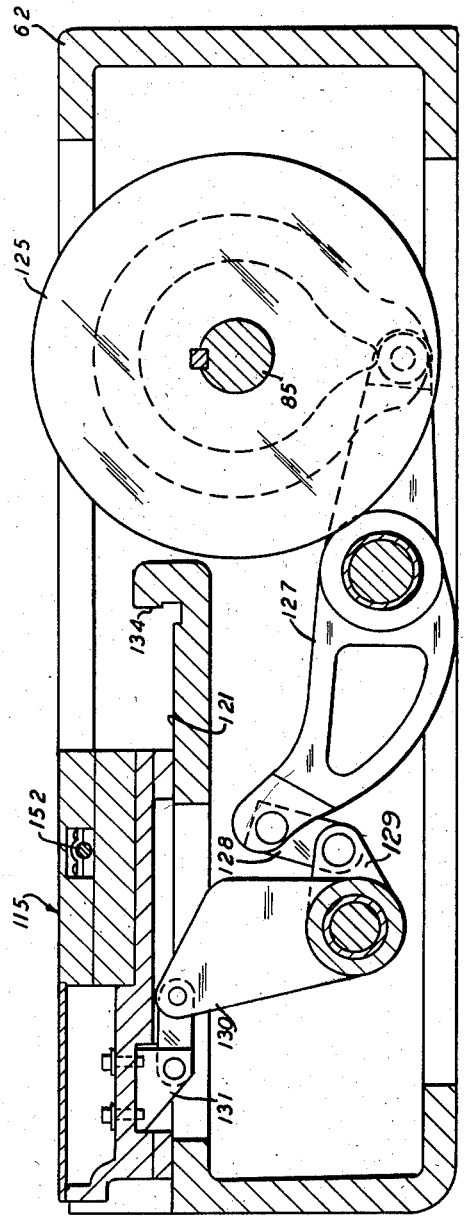
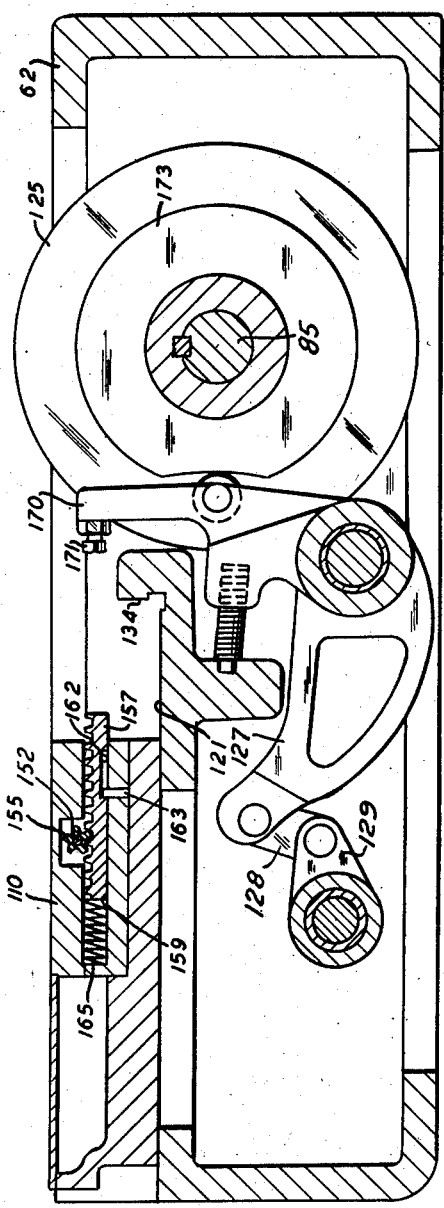
INVENTORS
J.M. DAVIS
B. A. RAETSCH
BY
ATTORNEY March 25, 1958 J. M. DAVIS ET AL 2,827,940
APPARATUS FOR ASSEMBLING TERMINALS TO MULTICONDUCTOR CORDS
Filed Feb. 21, 1955 15 Sheets-Sheet 10

INVENTORS
J. M. DAVIS
B. A. RAETSCH
BY
ATTORNEY

March 25, 1958  J. M. DAVIS ET AL  2,827,940
APPARATUS FOR ASSEMBLING TERMINALS TO MULTICONDUCTOR CORDS
Filed Feb. 21, 1955  15 Sheets-Sheet 11
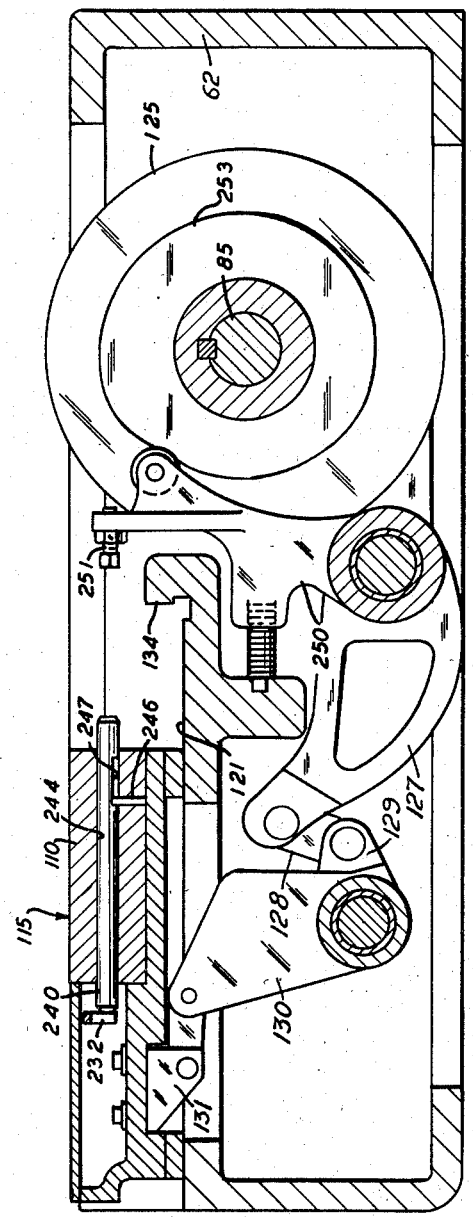
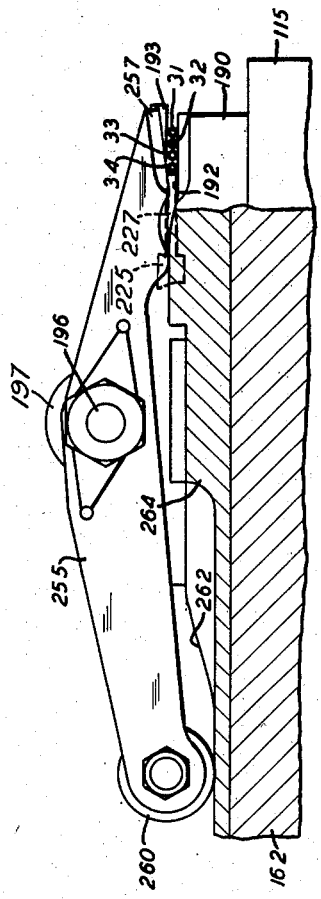
INVENTORS
J. M. DAVIS
B. A. RAETSCH
BY
ATTORNEY

INVENTORS
J. M. DAVIS
B. A. RAETSCH
BY
ATTORNEY

March 25, 1958  J. M. DAVIS ET AL  2,827,940
APPARATUS FOR ASSEMBLING TERMINALS TO MULTICONDUCTOR CORDS
Filed Feb. 21, 1955  15 Sheets-Sheet 14

INVENTORS
J. M. DAVIS
B. A. RAETSCH
BY
ATTORNEY

March 25, 1958 J. M. DAVIS ET AL 2,827,940
APPARATUS FOR ASSEMBLING TERMINALS TO MULTICONDUCTOR CORDS
Filed Feb. 21, 1955 15 Sheets-Sheet 15
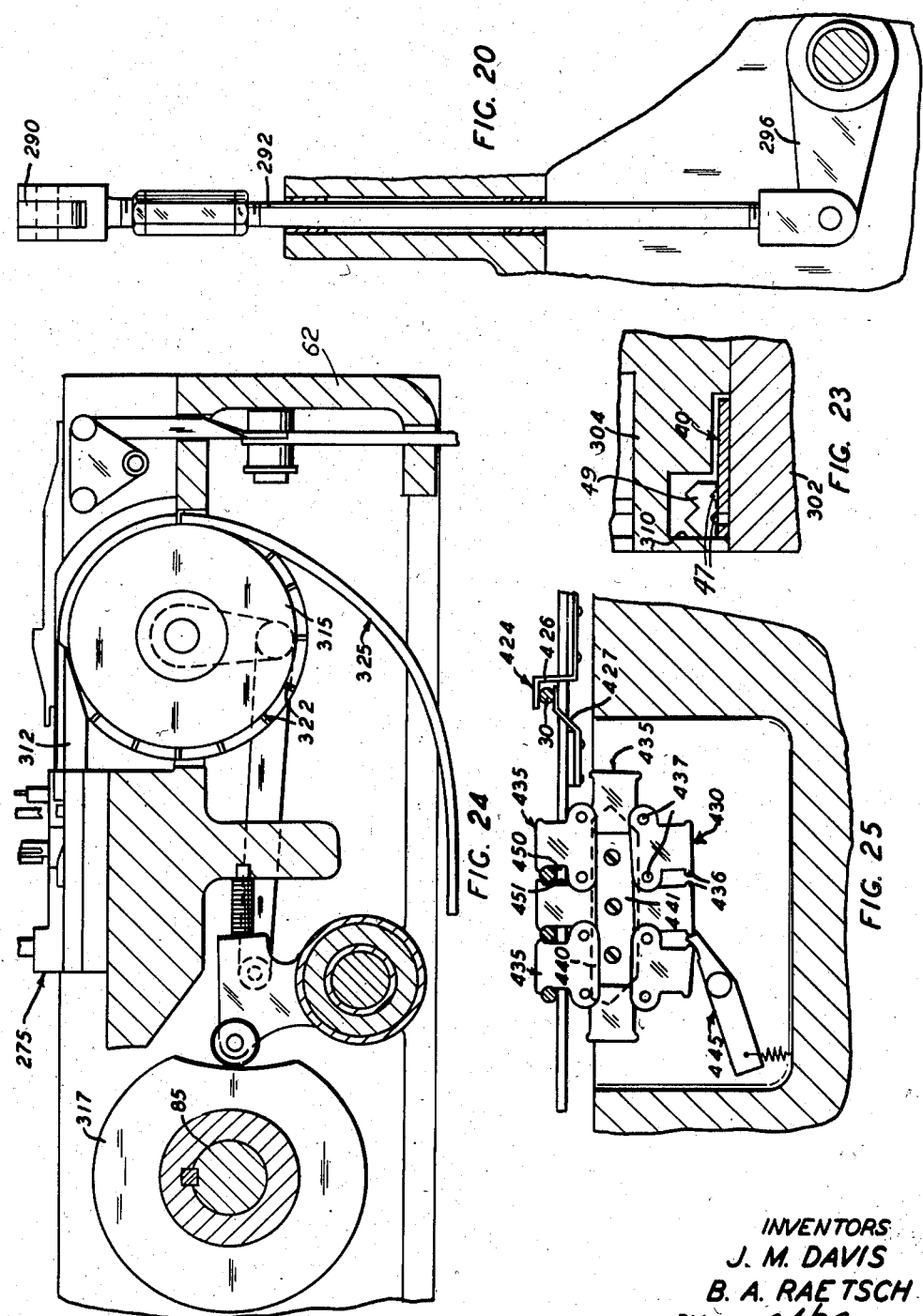
INVENTORS
J. M. DAVIS
B. A. RAETSCH
BY
ATTORNEY

United States Patent Office 2,827,940
Patented Mar. 25, 1958

2,827,940

APPARATUS FOR ASSEMBLING TERMINALS TO MULTICONDUCTOR CORDS

John M. Davis, Houston, Tex., and Bruno A. Raetsch, Lincoln Park, Pa., assignors to Western Electric Company, Incorporated, New York, N. Y., a corporation of New York Application February 21, 1955, Serial No. 489,408

16 Claims. (Cl. 153—1)

This invention relates to article assembling apparatus, and more particularly to press-operated apparatus for assembling parts of multiconductor telephone cords.

Multiconductor telephone cords manufactured for use in the communications industry are generally provided with hooked binding elements to prevent the end of the covering material on the cord from tearing and to provide means for securing the cord in place in a piece of electrical apparatus. In addition, the several individually insulated conductors comprising the multiconductor core of the cord are provided at both ends thereof with terminal elements designed to facilitate electrical connections between the conductors and other electrical elements of telephone circuits. Since, except for portions at each end of the cord, the multiconductor core is enveloped by a vulcanized jacket of rubber compound or neoprene compound, or the like, the individual conductors of the core cannot be handled completely separately during the operation in which the terminal elements are applied. This limitation greatly complicates the problem of providing suitable apparatus for rapidly applying the binding elements and terminals to the cord and the conductors, respectively.

It is an object of this invention to provide new and improved article assembling apparatus.

It is another object of this invention to provide new and improved apparatus for assembling the parts of multiconductor telephone cords.

Apparatus illustrating certain features of the invention may include means for retaining the several individually insulated conductors of a multiconductor cord initially aligned in coplanar relationship, means for feeding terminals having conductor engaging portions successively along a predetermined path adjacent to the conductor retaining means, and means operated in timed relation to the terminal feeding means for pushing the conductors individually and successively from the conductor retaining means and into engagement with the conductor engaging portions of successive terminals.

A complete understanding of the invention may be obtained from the following detailed description of article assembling apparatus forming one embodiment thereof, when read in conjunction with the appended drawings, in which:

Fig. 1A is a fragmentary side view showing an end portion of a finished multiconductor telephone cord;

Fig. 2 is a fragmentary plan view of a strip of terminal blanks;

Fig. 3 is an enlarged, fragmentary, perspective view of one of the terminal blanks;

Fig. 4 is a perspective view of a stay band blank;

Fig. 11 is a fragmentary, vertical section taken along line 11—11 of Fig. 9, with parts thereof broken away;

Fig. 12 is a fragmentary, vertical section taken along line 12—12 of Fig. 9;

Fig. 16 is a fragmentary, vertical section taken along line 16—16 of Fig. 9, with parts thereof broken away;

Fig. 17 is an enlarged, fragmentary, vertical section taken along line 17—17 of Fig. 8, with parts broken away;

Fig. 20 is a fragmentary, vertical section taken along line 20—20 of Fig. 9;

Fig. 23 is an enlarged, fragmentary, vertical section taken along line 23—23 of Fig. 18;

Fig. 24 is a fragmentary, vertical section taken along line 24—24 of Fig. 9, and Fig. 25 is a fragmentary, vertical section taken along line 25—25 of Fig. 8.

Figure 1:
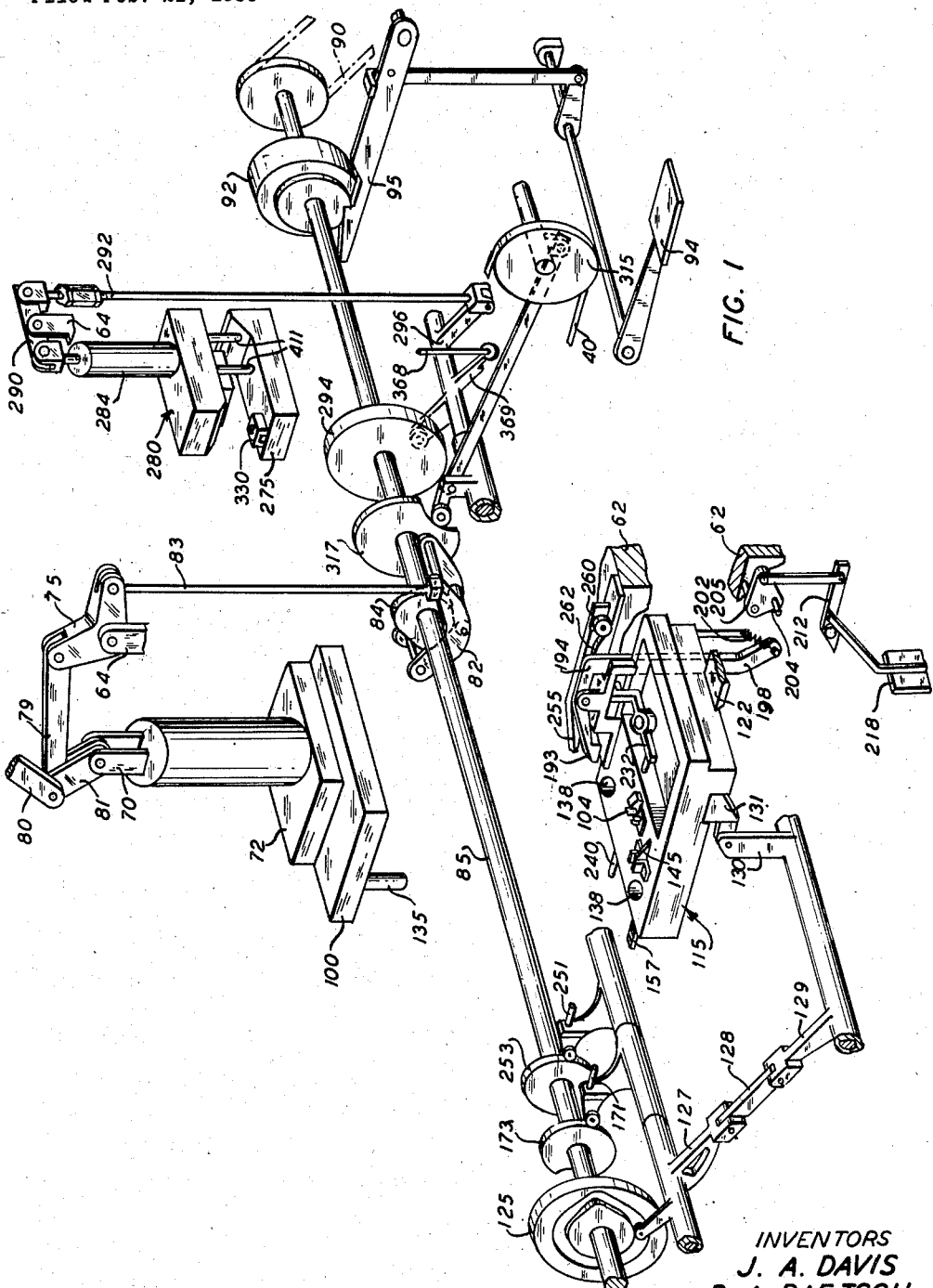
Fig. 1 is a perspective, mechanical, schematic diagram of portions of the apparatus embodying the invention, displaced in some instances to better illustrate the various parts and the interoperation thereof.

Referring to the drawings, particular reference being first had to Fig. 1A, there is shown an end portion of a multiconductor telephone cord, indicated generally at 30, which comprises four individually insulated conductors 31, 32, 33 and 34 covered by a common jacket 36 of a tough, resilient, vulcanized, rubbery elastomer compound, such as a neoprene jacketing compound, or the like. A portion of the jacket 36 at each end of the cord 30 is removed to expose the insulation on the end portions of the four conductors 31, 32, 33 and 34. The ends of these conductors are provided with solderless terminals 38—38 attached directly to the individual conductors while unstripped of their insulation.

In apparatus embodying the present invention, a strip 40 (Fig. 2) of partially preformed terminal blanks 41—41 is fed into the apparatus and the blanks are subsequently cut from the strip 40 and formed into the terminals 38—38 on the ends of the individual conductors 31, 32, 33 and 34, which have been cut to predetermined lengths. The strip 40 of partially preformed terminal blanks 41—41 is shown in detail in Fig. 2.

Referring now to Figs. 2 and 3, it may be seen that the individual terminal blanks 41—41 are interconnected by a web 42 and that each of the terminal blanks comprises a unitary metallic member having at one end a bifurcated connecting portion 44 and at the other end a partially preformed ferrule portion 45 provided with a pair of upwardly projecting prongs 47—47. Extending upwardly at either side of the ferrule portion 45 are wings 49—49 having serrated outer edges. Each of the terminal blanks 41—41 is partially preformed to give its ferrule portion 45 a substantially U-shaped cross section so that the wings 49—49 extend upwardly to form a conductor engaging receptacle. The prongs 47—47 are designed to pierce the insulation on the individually insulated conductors 31, 32, 33 and 34 and to engage the conductive metallic cores thereof, and the wings 49—49 are designed to be wrapped tightly in the form of a cylinder around the ends of the conductors.

In addition to the operation of attaching terminals 38—38 to the conductors 31, 32, 33 and 34, the apparatus attaches a stay band 50 (Fig. 1A) to the jacketed portion of the cord 30 immediately adjacent to the point where the jacket 36 is cut away to expose the end portions of the individually insulated conductors. Illustrated in Fig. 4 is a stay band blank 51 which comprises a partially preformed, U-shaped sleeve portion 55 having a hook portion 56 formed integrally therewith. The stay band blank 51 is attached to the cord 30 by pressing the U-shaped sleeve portion 55 into a tight cylinder about the jacketed cord to form the finished stay band 50.

Figure 5:
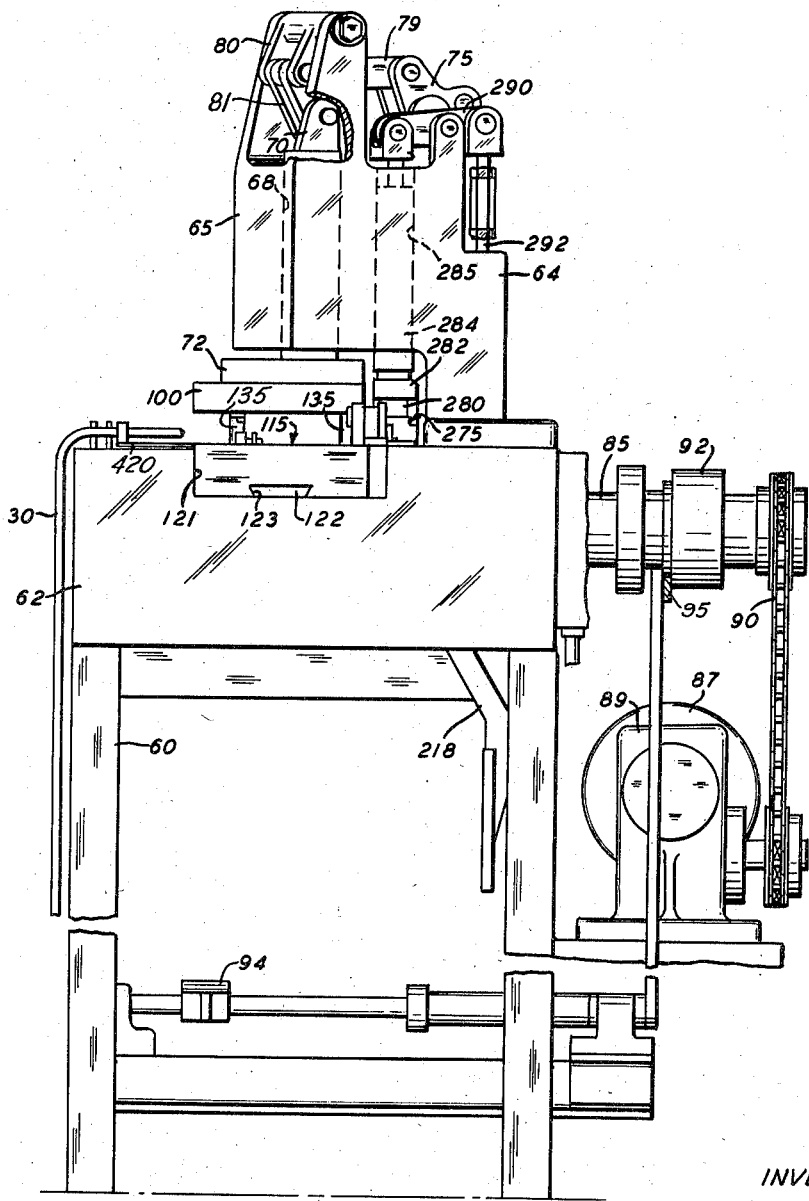
Fig. 5 is a front elevation of the article assembling apparatus, with parts thereof broken away.

Apparatus for attaching terminals 38—38 to the ends of the conductors 31, 32, 33 and 34, and the stay band 50 to the cord 30, as shown in Fig. 5, includes a bench 60 upon which is mounted a cast metal base housing 62. Positioned at one side of the base housing 62 is an upright standard 64 designed to support an integrally formed press head 65 which is positioned so as to overhang the top surface of the base housing 62. Slidably mounted within the press head 65 in a bore 68 is a vertically movable ram 70 designed to reciprocate a platen 72 attached to the lower end thereof. The ram 70 is operatively connected to a bell crank lever 75 through a series of linkages, indicated as 79, 80 and 81, which are designed to reciprocate the ram 70 vertically as the bell crank lever 75 is oscillated.

Figure 6:
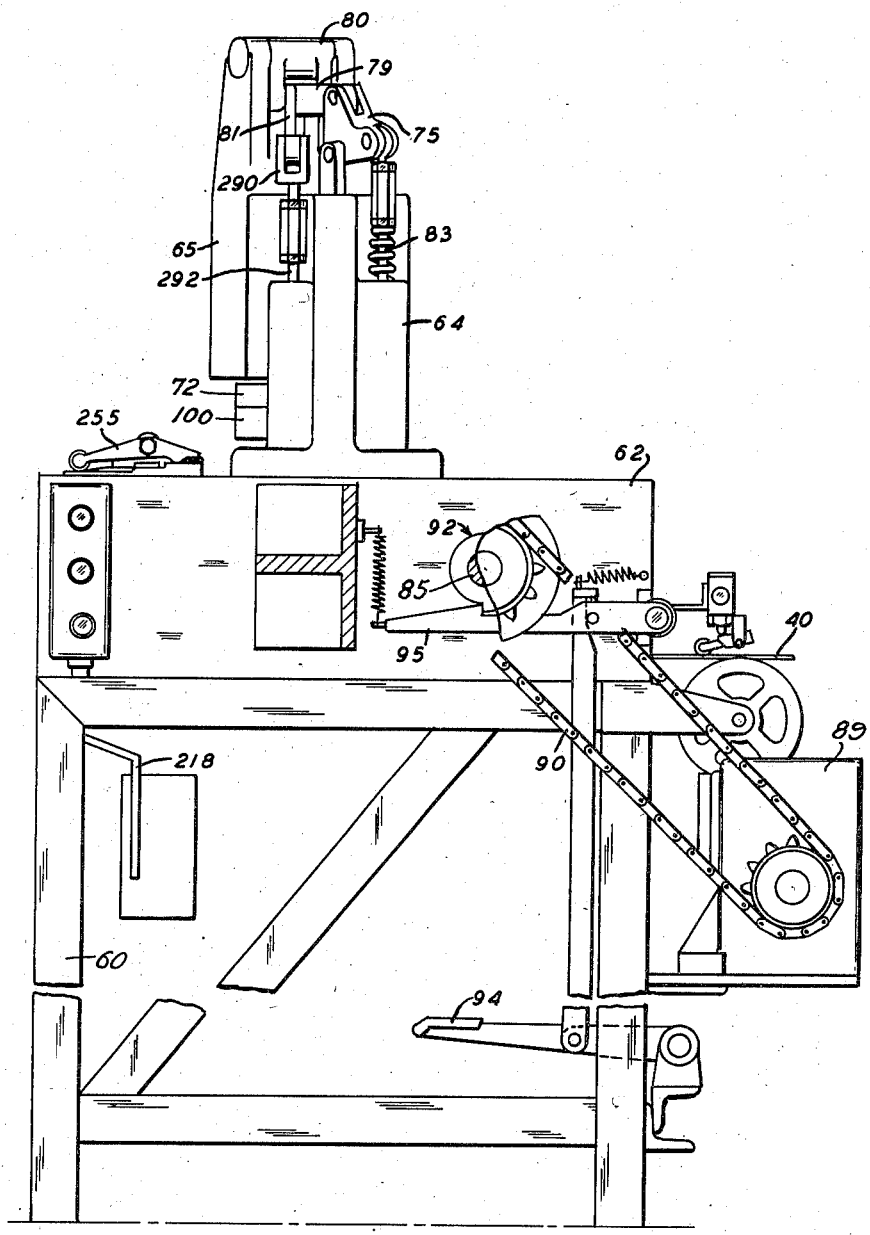
Fig. 6 is an enlarged, fragmentary side elevation of the apparatus shown in Fig. 5.
Figure 7:
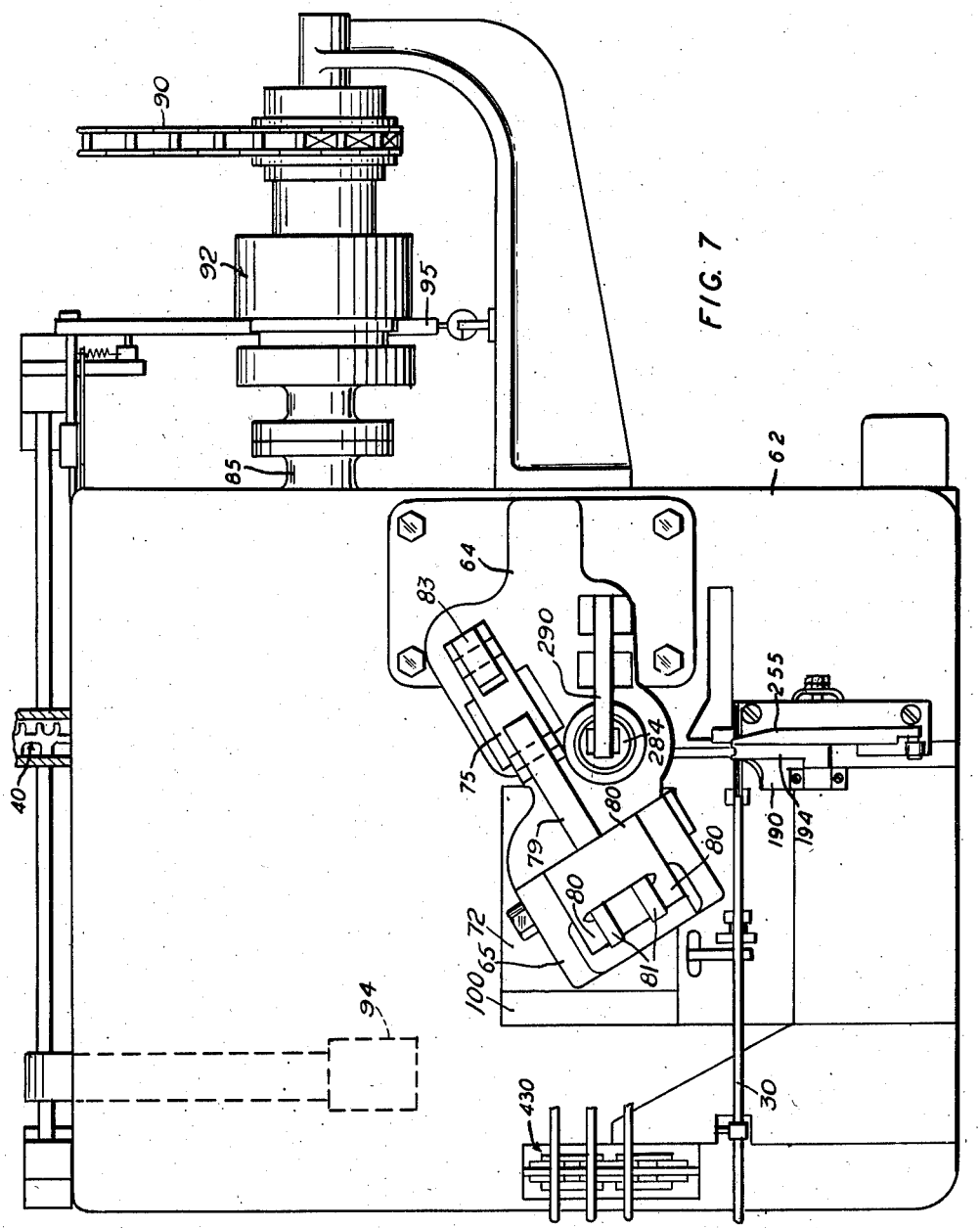
Fig. 7 is an enlarged, fragmentary top plan view of the apparatus shown in Fig. 5, with parts thereof broken away.
Figure 9:
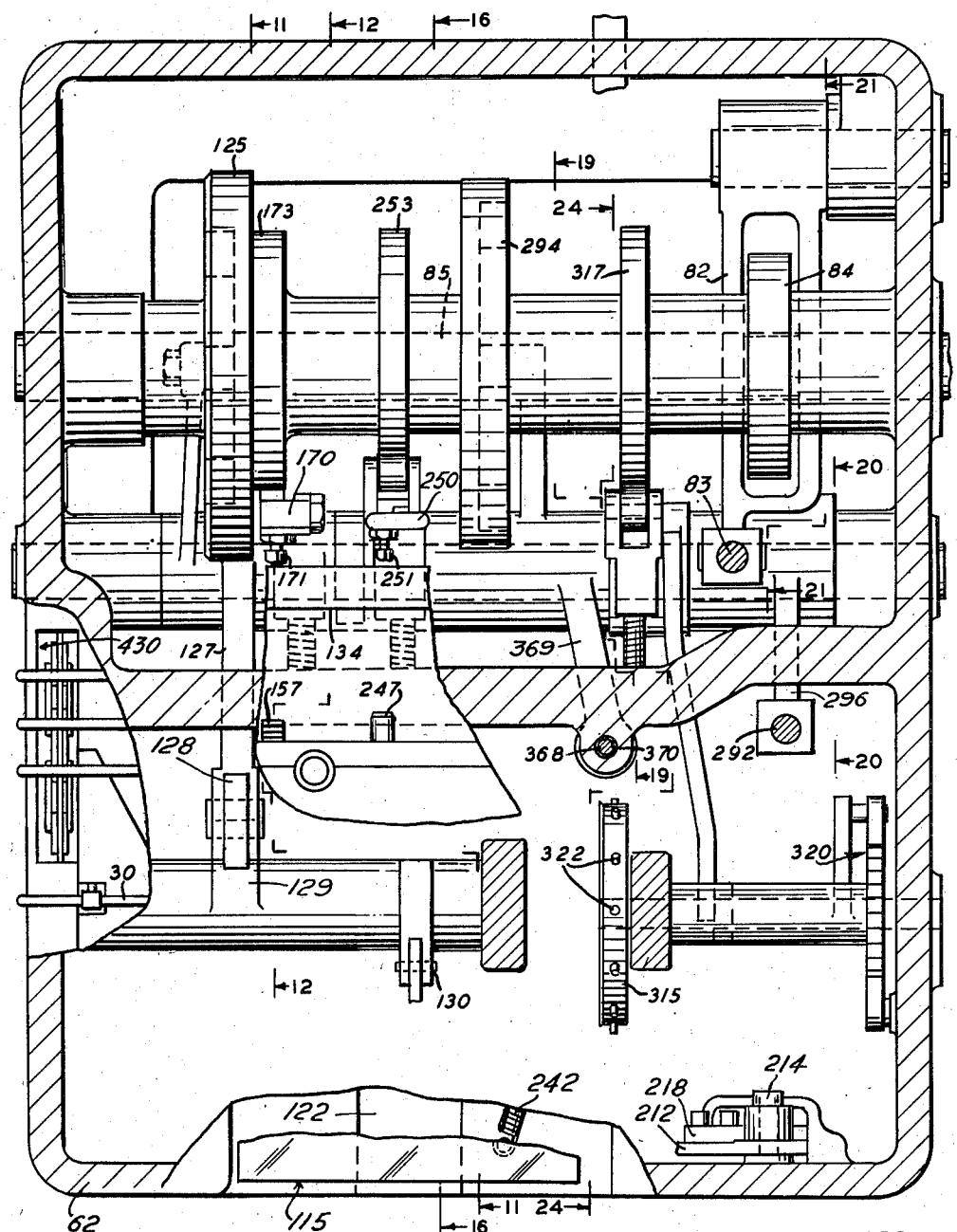
Fig. 9 is an enlarged, fragmentary plan view of portions of the apparatus shown in Fig. 7, with parts thereof broken away for clarity.
Figures 19, 21:
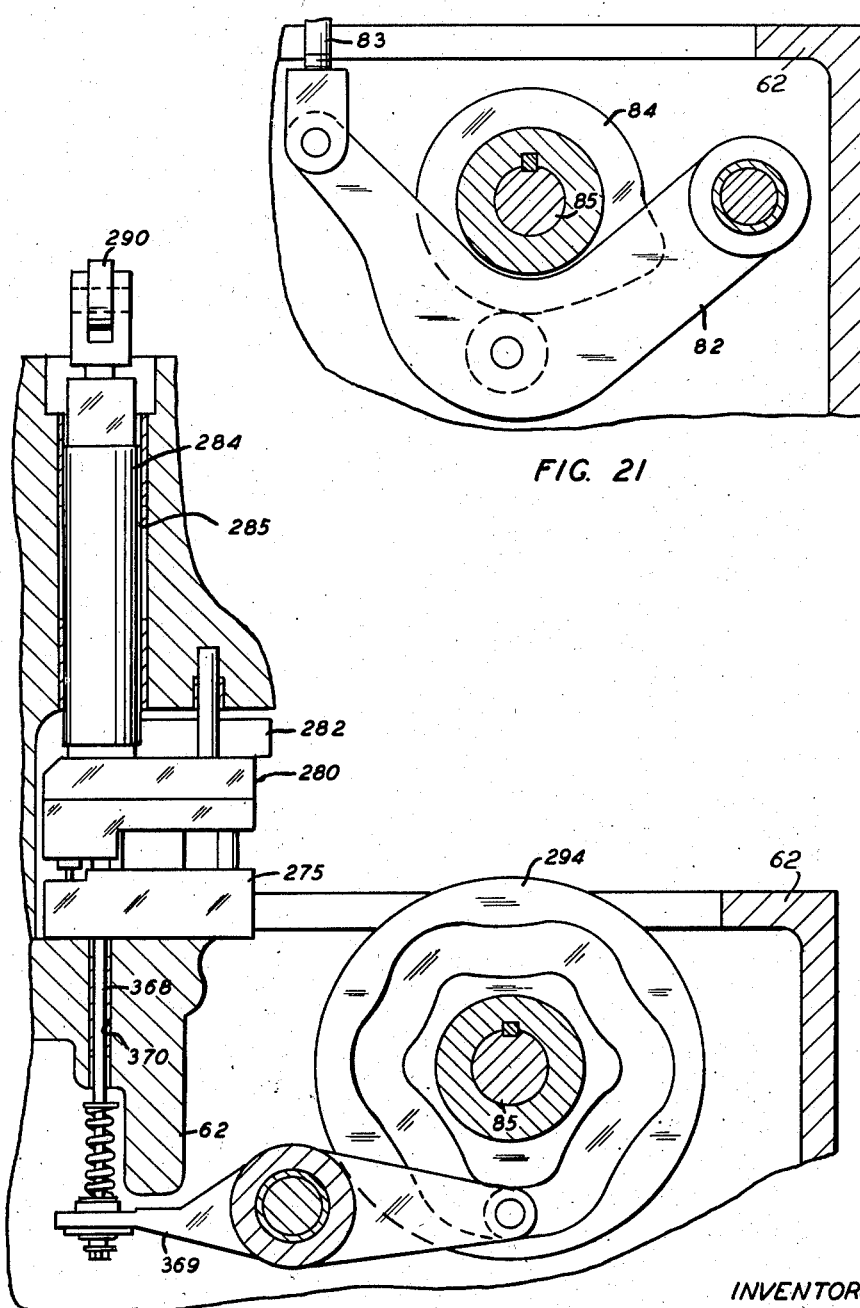
Fig. 19 is a fragmentary, vertical section taken along line 19—19 of Fig. 9.
Fig. 21 is a fragmentary, vertical section taken along line 21—21 of Fig. 9.

Oscillatory movement of the bell crank lever 75 is accomplished, through suitable linkages, including a C-shaped lever 82 and a push rod 83 (Figs. 1, 6 and 21), by means of a cam 84 mounted fixedly upon a cam shaft 85 (Figs. 1 and 9). The cam shaft 85 is driven rotatably by means of an electric motor 87 (Fig. 5) operatively connected thereto through a gear reduction unit 89, a chain drive 90 and a single-revolution clutch 92. The clutch 92 is of a conventional type and may be selectively operated by means of a foot pedal 94 which when depressed momentarily and then released, disengages a spring-biased detent 95 (Figs. 1 and 6) to connect the cam shaft 85 to the motor 87, whereby the motor turns the cam shaft through one complete revolution (360°).

Suitably attached to the lower surface of the platen 72 is a tool holder 100 designed to support fixedly a stay band forming tool 102 (Fig. 10) mounted thereon. The forming tool 102 is designed to cooperate with a stay band forming tool 104 positioned fixedly in a conforming aperture 105 in a tool holder 110 mounted on a reciprocating slide 115. The stay band forming tool 102 has a rounded forming surface 117, and the stay band forming tool 104 is provided with a rounded forming surface 118 having tapered guiding surfaces 119 and 120 at the sides thereof. The tapered guiding surfaces 119 and 120 serve to guide the stay band forming tool 104 into cooperation with the forming tool 102 when the latter are moved together.

Figure 8:
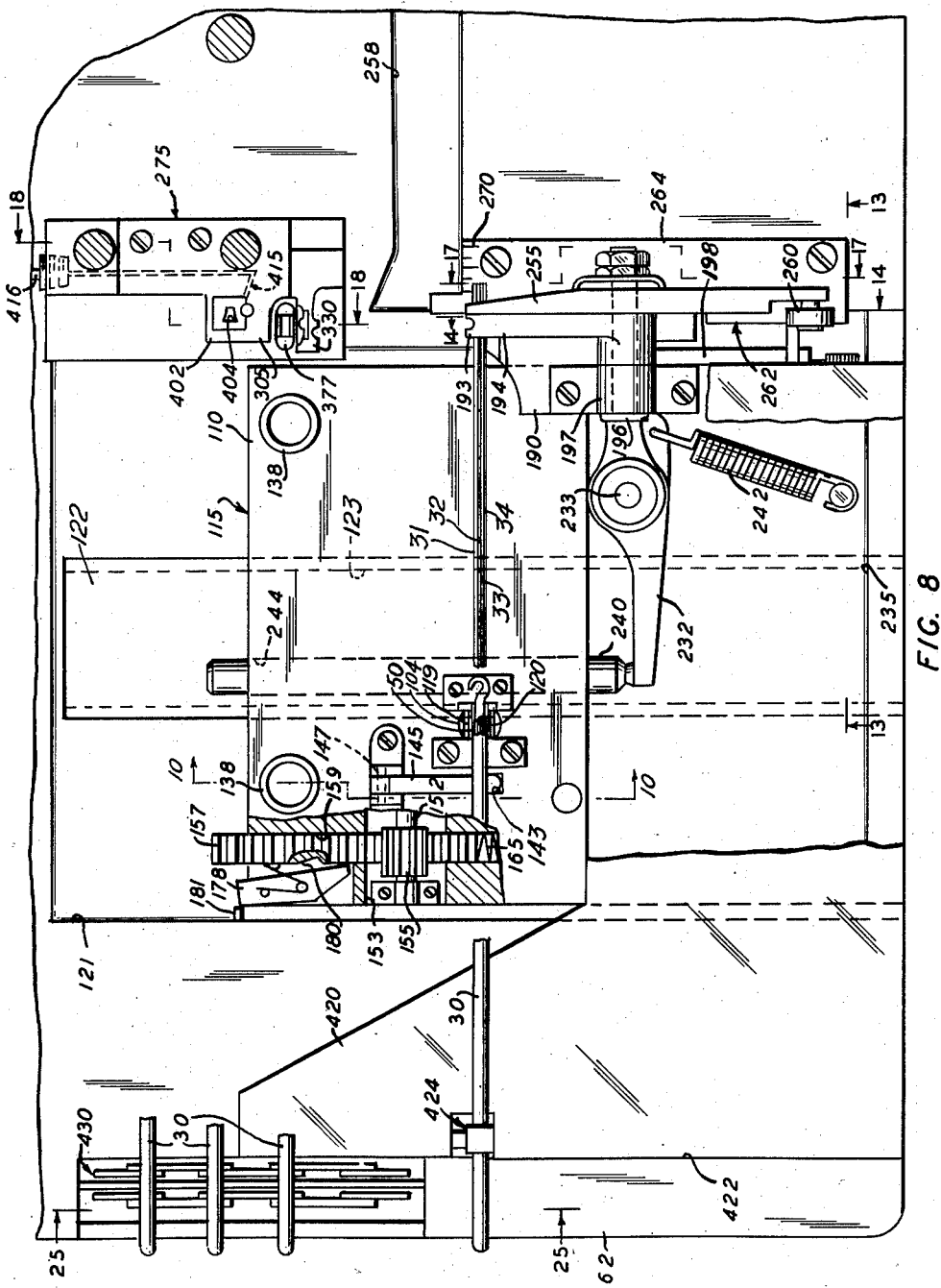
Fig. 8 is an enlarged, fragmentary plan view of portions of the apparatus shown in Fig. 7, with parts thereof broken away.

The slide 115, which carries the lower tool holder 110, is slidably mounted in a horizontally extending slideway 121 formed in the base housing 62. The slideway 121 is centered with respect to the platen 72 and is designed to permit the slide to be moved from its normal position, as shown in Fig. 8, to an operative position beneath the platen as shown in Fig. 1. A longitudinally extending dove-tailed guide 122 is mounted on the base housing 62 at the bottom of the slideway for cooperation with a complementary, longitudinally extending guideway 123 formed in the slide 115.

Reciprocating movement of the slide 115 is accomplished by means of a cam 125 (Figs. 1 and 11) mounted fixedly on the cam shaft 85 for rotation therewith. The cam 125 is operatively connected to the slide 115 through a suitable arrangement of linkages, including members 127, 128, 129, 130 and 131, which transform the rotary motion of the cam into timed reciprocating movement of the slide. In its operative position the slide 115 is positioned in contact with a transversely extending abutment 134 formed integrally with the base housing 62 at the rear end of the slideway 121.

Figure 10:
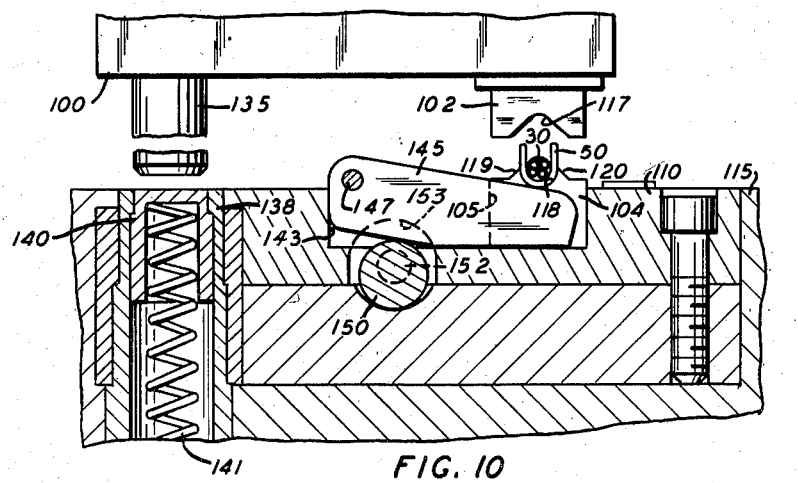
Fig. 10 is an enlarged, fragmentary, vertical section taken along line 10—10 of Fig. 8.

Depending from the tool holder 100 (Figs. 5 and 10) is a pair of spaced liner pins 135—135 designed to cooperate with a pair of matching liner sleeves 138—138 (Figs. 8 and 10) carried by the slide 115. The liner pins 135—135, in cooperation with the liner sleeves 138—138, serve to position the stay band forming tool 102 accurately with respect to the stay band forming tool 104 when the slide 115 is in its operative position beneath the platen 72. Slidably positioned in each of the liner sleeves 138—138 is a shouldered cover member 140, which is normally urged upwardly into a position covering the open end of the sleeve by a compression spring 141 mounted therein. When the liner pins 135—135 are not engaged within the corresponding liner sleeves 138—138 the cover members 140—140 are flush with the top surface of the tool holder 110 of the slide 115 (Fig. 10).

Positioned in a longitudinally extending slot 143 (Fig 10), formed in the tool holder 110 adjacent to the stay band forming tool 104, is an ejector arm 145. The ejector arm 145 is pivotally mounted at one end thereof on a pin 147 and is actuated by means of a cam 150 secured to a transversely extending shaft 152 rotatably mounted within a cavity 153 formed in the tool holder 110. The shaft 152 is provided with a pinion gear 155 (Fig. 8), which meshes with an elongated rack 157 slidably mounted within a longitudinally extending slot 159 formed in the tool holder 110. The bottom surface of the rack 157 is relieved by a longitudinally extending slot 162 (Fig. 12), in which is engaged a pin 163 fixedly mounted in the tool holder 110 in the bottom of the slot 159. The cooperating pin 163 and the slot 162 are designed to permit limited reciprocation of the rack 157.

A compression spring 165 normally urges the rack 157 toward the right, as viewed in Fig. 12. When the rack 157 is in its extreme right hand position, as viewed in Fig. 12, the ejector arm 145 is in its normal, retracted position, as shown in Fig. 10, with the free end thereof positioned below the rounded forming surface 118 of the forming tool 104. When the rack is moved to the extreme left, as viewed in Fig. 12, against the action of the compression spring 165, the pinion gear 155 is driven thereby to rotate the shaft 152 in a counterclockwise direction (Fig. 10) to turn the cam 150 to a position wherein it causes the ejector arm 145 to pivot in a counterclockwise direction about the pin 147.

Movement of the rack 157 to its extreme left hand position, as viewed in Fig. 12, is accomplished by means of a spring-biased, pivotally-mounted, cam-operated lever 170 provided with an adjustable striker 171. The movement of the lever 170 is controlled by a cam 173 (Figs. 1 and 12) mounted fixedly on the cam shaft 85 for rotation therewith. The striker 171 on the cam-operated lever 170 is designed to contact the end of the rack 157 when the slide 115 is in its operative position against the abutment 134 at the end of the slideway 121.

Mounted at the left hand side of the slide 115, as viewed in Fig. 8, is a spring-biased detent 178 designed to cooperate with a notch 180 formed in the adjacent side of the slidable rack 157. When the slide 115 is in its normal position, the spring-biased detent 178 is held disengaged from the notch 180 in the rack 157 by a pin 181 projecting from the side of the slideway 121 and the rack assumes its normal position, as viewed in Fig. 8, into which position it is urged by the compression spring 165. However, when the slide 115 is in its operative position and the rack 157 has been forced to its extreme left hand position, as viewed in Fig. 12, by the lever 170, the detent 178 becomes engaged in the notch 180 and holds the rack in this position until the slide returns to its normal position.

Figure 14:
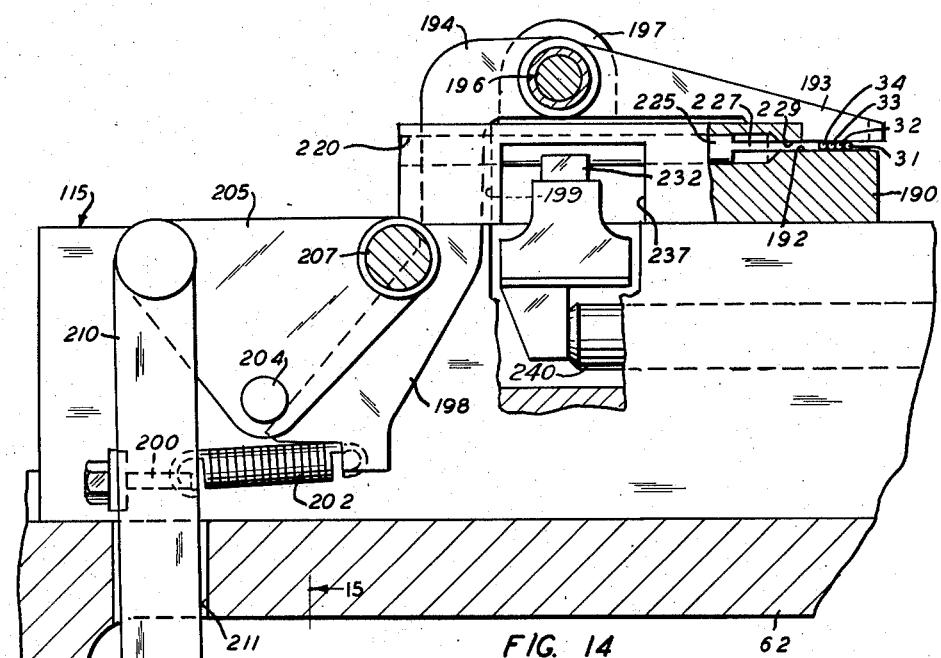
Fig. 14 is an enlarged, fragmentary, vertical section taken along line 14—14 of Fig. 8, with parts thereof broken away.

Mounted fixedly to the top of the slide 115 at the right hand side thereof, as viewed in Fig. 8, is a shear block 190. The right hand portion of the shear block 190 extends laterally from the slide 115 and overhangs the right hand edge thereof. The vertical side of the slideway 121 adjacent to the overhanging portion of the shear block 190 is relieved so that the shear block can move with the slide without interference. The right hand end of the shear block 190, as viewed in Fig. 14, is provided with a transversely extending, stepped down clamping surface 192. The clamping surface 192 is substantially flat and horizontal, and is designed to cooperate with a nose portion 193 of a clamp 194 to hold the several individually insulated conductors 31, 32, 33 and 34 of a cord 30 in a coplanar arrangement therebetween. The clamp 194 is pivotally mounted on a laterally projecting stub shaft 196 mounted fixedly at one end to a bracket member 197 fastened to the top of the shear block 190.

The left end of the clamp 194, as viewed in Fig. 14, is provided with an angularly depending arm 198 which extends through a slot 199 formed in the shear block 190. The free end of the depending arm 198 is resiliently connected by a tension spring 202 to a lug 200 (Fig. 14) projecting from the slide 115. The tension spring 202 normally urges the clamp 194 in a clockwise direction, as viewed in Fig. 14, and in a counterclockwise direction as viewed in Fig. 1, to force the nose portion 193 thereof into cooperation with the clamping surface 192 provided on the shear block 190.

Figure 13:
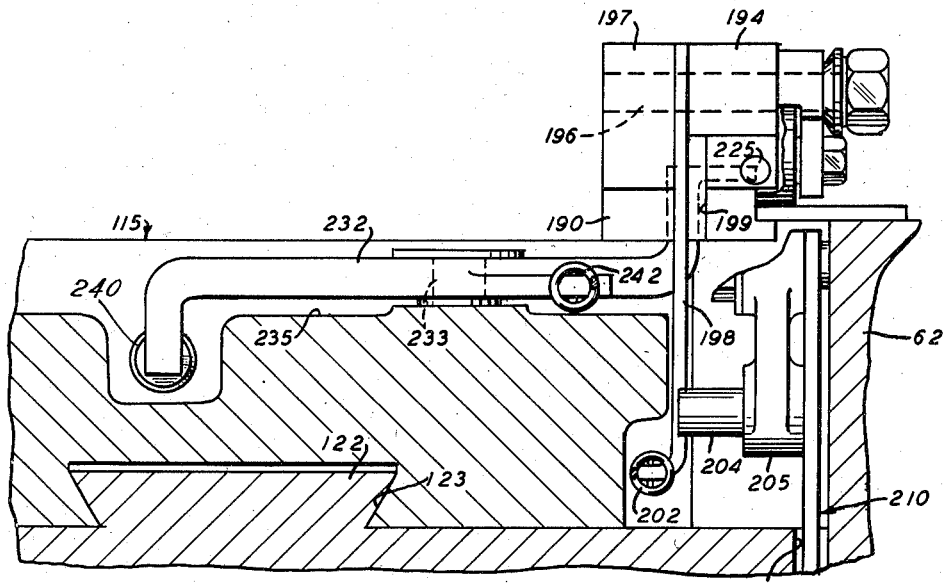
Fig. 13 is an enlarged, fragmentary, vertical section taken along line 13—13 of Fig. 8, with parts thereof broken away for clarity.
Figure 15:
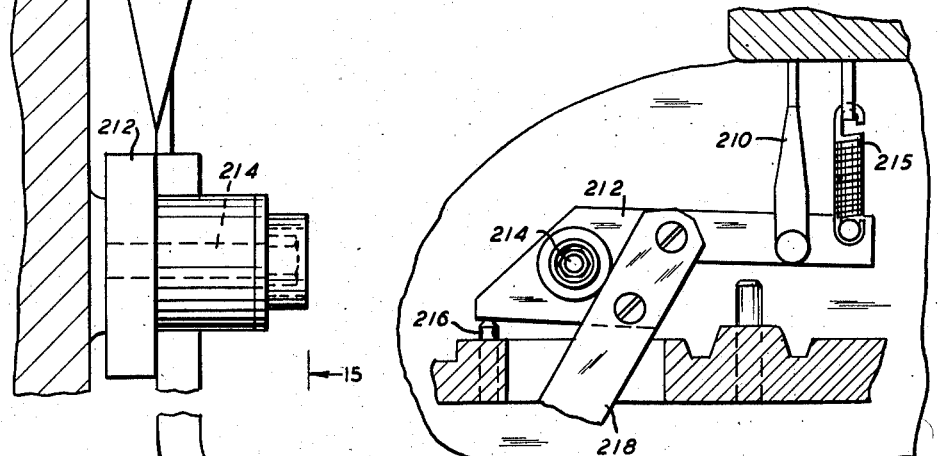
Fig. 15 is a reduced, fragmentary, vertical section taken along line 15—15 of Fig. 14.

When the slide 115 is in its normal position, as shown in Fig. 14, the depending arm 198 of the clamp 194 is positioned in engagement with a laterally extending pin 204 (Figs. 1 and 13) projecting from a bell crank lever 205 attached pivotally by means of a pivot pin 207 to the base housing 62 at the side of the slideway 121. The bell crank lever 205 is operated by a lever 210, which depends through an aperture 211 (Fig. 13) provided in the bottom of the slideway 121. The lower end of the lever 210 is connected to a rocker arm 212 pivotally mounted to the base 62 by means of a pivot pin 214. As shown in Fig. 15, the rocker arm 212 is normally urged by means of a tension spring 215 in a counterclockwise direction against a stop 216. When the rocker arm 212 is in its normal, inoperative position against the stop 216, the bell crank lever 205 is also in its normal, inoperative position, as shown in Fig. 14.

Attached fixedly to the rocker arm 212 is a depending knee-operated lever 218. When the lever 218 is pushed to the left, as viewed in Fig. 15, it causes the rocker arm 212 to rotate clockwise against the resilient action of the tension spring 215, whereby the bell crank lever 205 is operated in a counterclockwise direction, as viewed in Fig. 14. When the slide 115 is in its normal position, as shown in Fig. 14, counterclockwise rotation of the bell crank 205 will release the clamp 194 from clamping position by causing it to pivot counterclockwise on the stub shaft 196. However, when the slide 115 is in a position other than its normal position, the clamp 194 is held in its clamping position by the resilient action of the tension spring 202 attached to its depending arm 198.

Referring again to Fig. 14, the shear block 190 is provided with a longitudinally extending bore 220, in which is slidably mounted a rod-like pusher 225 having an elongated, flat tip 227 of reduced thickness. The tip 227 projects through an aperture 229 communicating with the bore 220 into sliding contact with the clamping surface 192. The pusher 225 is operated slidably by an operating lever 232 (Figs. 1, 13 and 14), which is mounted pivotally on a pin 233 attached to the bottom of a cavity 235 formed in the slide 115. One end of the operating lever 232 is connected to an intermediate portion of the pusher 225, which is exposed at a cutout 237 formed in the shear block 190. The other end of the pivotally mounted operating lever 232 is held resiliently against the end of a push rod 240 by a tension spring 242 (Fig. 8).

The push rod 240, as shown in Figs. 8 and 16, is slidably received within a longitudinally extending bore 244 formed within the tool holder 110 on the slide 115, with both ends thereof projecting from the bore. A pin 246 secured to the wall of the bore 244 and a slot 247 formed in the push rod 240 cooperate to limit the sliding motion of the push rod. The sliding motion of the push rod 240 is effected by means of a spring-biased, pivotally mounted lever 250 provided with an adjustable striker 251 (Figs. 1 and 16). The movement of the lever 250 is controlled by a cam 253 mounted fixedly on the cam shaft 85 for rotation therewith. The striker 251 on the lever 250 is designed to contact the adjacent end of the push rod 240 only when the slide 115 is in its operative position against the abutment 134 at the end of the slideway 121. When the slide 115 is in a position other than its operative position, the tension spring 242 urges the operating lever 232 to its extreme clockwise position, as viewed in Fig. 8, in which position the pusher 225 is retracted and the elongated tip 227 is flush with the outer end of the aperture 229 formed in the shear block 190.

A cutter 255 (Figs. 1 and 17) is pivotally mounted on the outer end of the stub shaft 196 adjacent to the pivotally mounted clamp 194. One end of the cutter 255 is provided with a blade portion 257 designed to cooperate with a sharpened right hand edge of the clamping surface 192 formed on the forward end of the shear block 190 to sever the coplanarly disposed conductors 31, 32, 33 and 34 held against the clamping surface by the cooperating nose portion 193 of the clamp 194. The excess end portions severed by the cutter 255 fall into a suitable receptacle (not shown) through a scrap opening 258 provided in the base housing 62 adjacent to the cutter. The other end of the cutter 255 is provided with a cam follower 260, which engages and rides on a camming surface 262 provided on a cam plate 264 mounted on the base housing 62.

When the slide 115 is in its normal inoperative position, the pivotally mounted cutter 255 is in its extreme counterclockwise position, as viewed in Fig. 17, with the cutting edge of the blade portion 257 and the cooperating sharpened edge of the clamping surface 192 on the shear block 190 separated sufficiently to permit conductors 31, 32, 33 and 34 of a cord 30 to be inserted therebetween. The cutter 255 is spring loaded so that the cam follower 260 is always in engagement with the camming surface 262 on the cam plate 264. As the slide 115 moves forward to its operative position, the cam follower 260 climbs a rise formed on the camming surface 262 of the cam plate 264, thereby forcing the cutter 255 to pivot in a clockwise direction, as viewed in Fig. 17, to bring the cooperating blade portion 257 of the cutter and the corresponding sharpened edge of the clamping surface 192 on the shear block 190 together to sever excess portions from the conductors 31, 32, 33 and 34 of a cord 30 positioned therebetween. As shown in Fig. 8, a scale 270 is provided to facilitate accurate measurements of the lengths of the conductors 31, 32, 33 and 34 of a cord 30 to determine the amounts thereof to be removed in the cutting operation. It will be understood that the cord 30 may be made with individual conductors 31, 32, 33 and 34 of different lengths.

Figure 18:
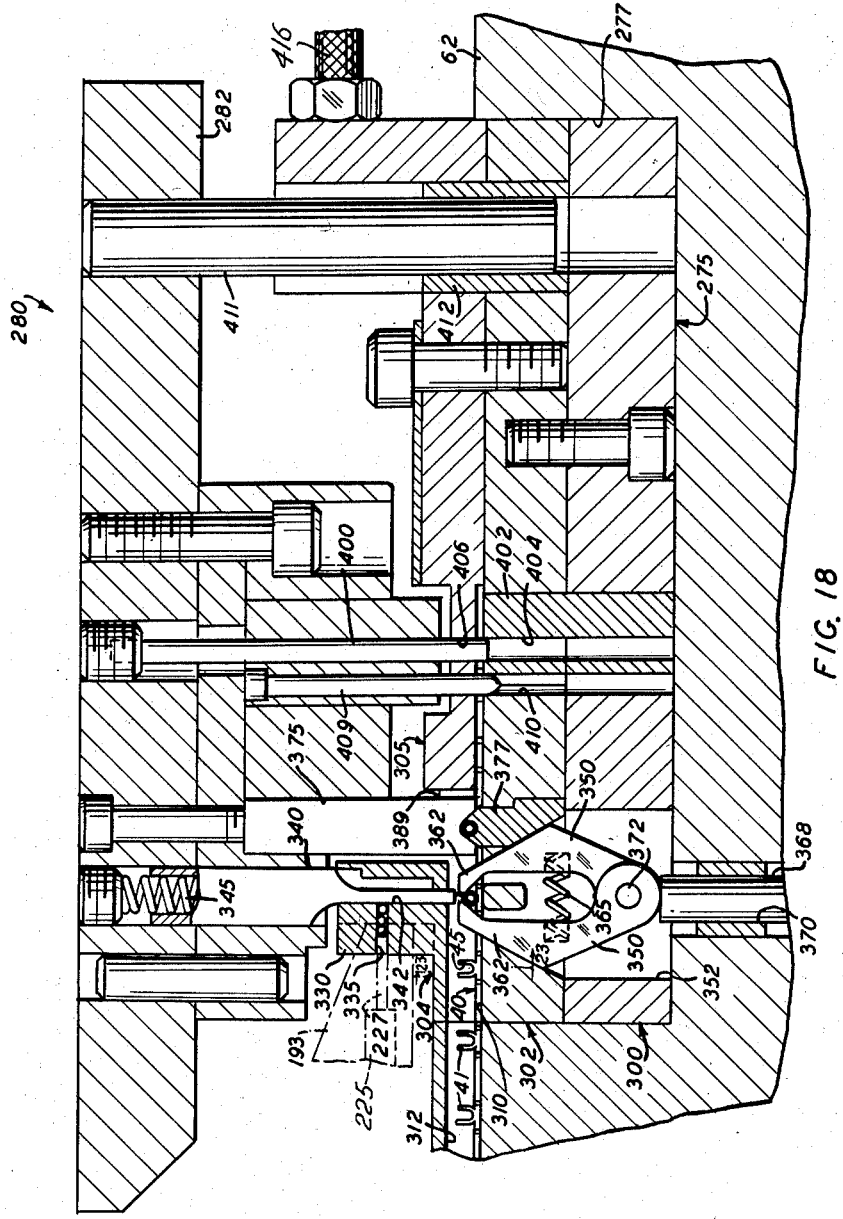
Fig. 18 is an enlarged, fragmentary, vertical section taken along line 18—18 of Fig. 8.

When the slide 115 is located in its operative position, the leading edge of the clamping surface 192 on the shear block 190 and the cooperating nose portion 193 of the clamp 194, as shown in phantom lines in Fig. 18, are positioned immediately adjacent to a gang die assembly, shown generally at 275. The gang die assembly 275 is seated partly within a conforming, generally rectangular well 277 formed in the base housing 62, and is designed to cooperate with a gang punch assembly, indicated generally at 280, which is attached to a vertically movable platen 282. The platen 282 is secured to the lower end of a reciprocable ram 284 (Fig. 5) mounted slidably in a vertically extending bore 285 formed in the press head 65.

Reciprocating movement of the ram 284 (Figs. 1, 5 and 19), to move the gang punch assembly 280 into and out of cooperation with the gang die assembly 275, is effected by a rocker arm 290 mounted pivotally on the press head 65 and connected to a slidably mounted operating rod 292 which, in turn, is operatively connected to a cam 294 driven rotatably by the cam shaft 85. The rotary movement of the cam 294 is translated by suitable linkages into oscillatory movement of a pivotally mounted crank arm 296 (Fig. 20), to which the lower end of the operating rod 292 is hingedly connected.

The gang die assembly 275 (Fig. 18) includes a generally rectangular-shaped bolster plate 300, which supports an apertured die plate 302 mounted fixedly thereupon. A guide block 304 is secured to the top of the left hand end of the die plate 302, as viewed in Figs. 18 and 22, and an apertured cover plate 305 likewise is secured fixedly to the die plate to the right of the guide block. The guide block 304 and cover plate 305 cooperate with the die plate 302 to define a guide passage 310 (Figs. 22 and 23) through which the strip 40 of terminal blanks 41—41 may be fed.

Communicating with the guide passage 310 is a similar guide passage 312 formed in the base housing 62. The strip 40 of terminal blanks 41—41 is fed lengthwise in successive, equal steps through the guide passage 312 into the guide passage 310. The distance of each successive step of the strip 40 is equal to the distance between corresponding points on two adjacent interconnected terminal blanks 41—41.

The step-wise feed movement of the strip 40 is accomplished by a conventional feed mechanism, including a feed wheel 315 (Figs. 1, 9 and 24) operated by a cam 317 driven rotatably by the cam shaft 85. The cam 317 is operatively connected to the feed wheel 315 through suitable linkages including a ratchet and pawl device, indicated generally at 320. The periphery of the feed wheel 315 is provided with a plurality of equally spaced, outwardly projecting pins 322—322, which engage the bifurcated connecting portions 44—44 of the terminal blanks 41—41 to provide a positive feed. The strip 40 is guided partly around the feed wheel 315 from a continuous supply thereof (not shown) by a guide track, indicated generally at 325 (Fig. 24).

The guide block 304 is provided with an upwardly projecting, stepped portion 330 so configured as to receive closely the leading end of the shear block 190 and the nose portion 193 of the clamp 194 when the slide 115 is in its operative position, as shown by phantom lines thereof in Fig. 18. In their operative positions, the leading end of the shear block 190 and the nose portion 193 of the clamp 194 are in close proximity to the stepped portion 330 of the guide block 304, with the horizontal clamping surface 192 flush with the bottom of a horizontal guide slot 335 formed in the guide block. The horizontal guide slot 335 is designed to receive sidewise the ends of the conductors 31, 32, 33 and 34, which are pushed sidewise by the tip 227 of the pusher 225 from between the cooperating nose portion 193 of the clamp 194 and the clamping surface 192 of the shear block 190. The pusher 225 is advanced from left to right, as viewed in Figs. 14 and 18, in timed relationship with the operation of the cooperating gang punch assembly 280 and gang die assembly 275, to cause the tip 227 to push the ends of the conductors 31, 32, 33 and 34 sidewise through the horizontal guide slot 335 to feed them successively to a conductor placing finger 340 forming part of the gang punch assembly 280.

The conductor placing finger 340 is located at a precrimping station and is designed to move vertically in a vertical guide slot 342 formed in the stepped portion 330 of the guide block 304 transversely with respect to and communicating with the horizontal guide slot 335. Both the horizontal guide slot 335 and the vertical guide slot 342 are open at the left hand side thereof, as viewed in Figs. 18 and 22, to permit the conductors 31, 32, 33 and 34 to be moved sidewise therein. When the ram 284 moves the gang punch assembly 280 downwardly into cooperation with the gang die assembly 275, the conductor placing finger 340 moves downwardly in the vertical guide slot 342 and engages one of the conductors 31, 32, 33 and 34, which has been previously inserted into the vertical guide slot by the tip 227 of the pusher 225. The conductor placing finger 340 then pushes that conductor downwardly into the U-shaped, ferrule portion 45 of one of the terminal blanks 41—41 of the strip 40.

The feed wheel 315 indexes the strip 40 in timed relationship with the operation of the cooperating gang punch assembly 280 and gang die assembly 275 so that one of the terminal blanks 41—41 of the strip is always positioned directly beneath the vertical guide slot 342 for receiving one of the conductors 31, 32, 33 and 34 as it is pushed downwardly by the conductor placing finger 340. The conductor placing finger 340, as shown in Fig. 18, is mounted resiliently in the gang punch assembly 280 by means of a compression spring 345. The spring 345 is designed to urge the conductor placing finger 340 against the engaged conductor with sufficient force to cause the upwardly projecting prongs 47—47 of the terminal blank 41 to penetrate the insulation and engage the conductive core of the conductor.

Figure 22:
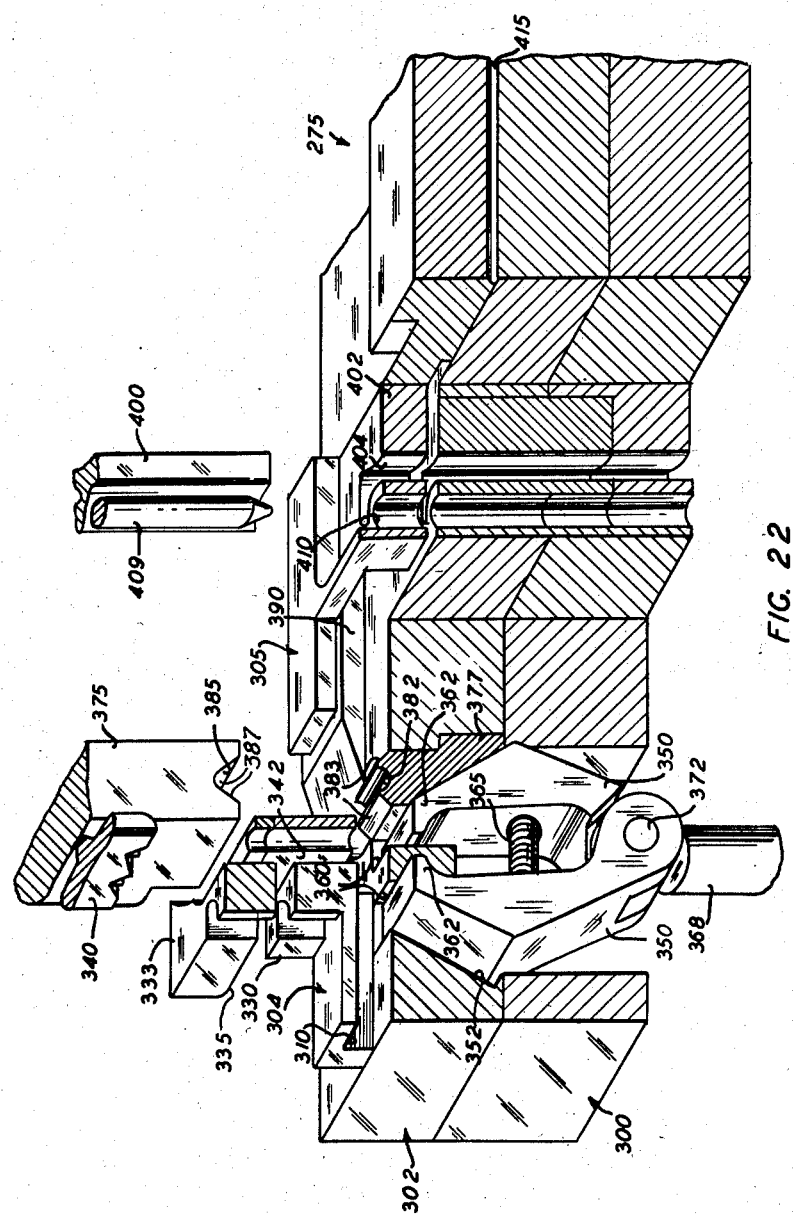
Fig. 22 is an enlarged, fragmentary, perspective view of portions of the gang punch and die assemblies shown in Fig. 18, with parts thereof broken away.

Cooperating with the conductor placing finger 340 to perform the precrimping operation are a pair of hinged forming fingers 350—350 slidably mounted for vertical movement in a socket 352 formed in the bolster plate 300 and the die plate 302. As shown in Figs. 18 and 22, the socket 352 extends completely through the bolster plate 300, but only partly through the die plate 302. The portion of the socket 352 in the die plate 302 is tapered and communicates with a pair of spaced, rectangular apertures 360—360 which, in turn, communicate with the guide passage 310. Forming tips 362—362 provided on the free ends of the forming fingers 350—350 are designed to be moved through the apertures 360—360 into extended positions straddling the U-shaped, ferrule portion 45 of the terminal blank 41 then positioned beneath the vertical guide slot 342.

The forming tips 362—362 are normally retracted within the apertures 360—360 so that they are flush with the bottom of the guide passage 310, and are urged apart by a compression spring 365 positioned between the forming fingers 350—350. When the conductor placing finger 340 descends through the vertical guide slot 342, carrying ahead of it one of the conductors 31, 32, 33 and 34, the forming fingers 350—350 are moved upwardly by a vertically movable push rod 368 (Figs. 1 and 19), which is operated by the cam 294 through a pivotally mounted lever 369 and is slidably mounted in a bore 370 formed in the base housing 62.

The upper end of the push rod 368 (Fig. 18) engages the forming fingers 350—350 at their hinged connection 372. As the forming fingers 350—350 are moved upwardly by the end of the push rod 368, the tapered walls of the socket 352 force the forming tips 362—362 toward each other and against the upwardly extending wings 49—49 of the ferrule portion 45 of the terminal blank 41 positioned therebetween. The forming tips 362—362 thereafter cooperate with the end of the conductor placing finger 340 to crimp the wings 49—49 partially about the conductor which has been seated in the ferrule portion 45 of the terminal blank 41 by the conductor placing finger.

After the precrimping operation has been performed by the cooperating conductor placing finger 340 and forming fingers 350—350, the strip 40 is indexed one step by the feed wheel 315. This step carries the terminal blank 41 having the wings 49—49 of its ferrule portion 45 precrimped about the end one of the conductors 31, 32, 33 and 34 to a second station. At the second station the precrimped ferrule portion 45 and partly enclosed conductor are positioned between a forming punch 375 and a cooperating forming die 377. The forming die 377 is provided with a rounded concave forming surface 382 and tapered guide surfaces 383—383. The cooperating forming punch 375 is provided with a rounded concave forming surface 385 and tapered guide surfaces 387—387 complementary to the guide surfaces 383—383 on the forming die 377. The forming punch 375 is mounted in the gang punch assembly 280, and is designed to move through a cutout 389 in the cover plate 305 into cooperation with the forming die 377 which is mounted in the die plate 302. The punch 375 and the die 377 crimp the wings 49—49 of the ferrule portion 45 of the terminal blank 41 completely and tightly about the end of the conductor.

As shown in Fig. 22, the forming die 377 projects slightly above the bottom of the guide passage 310 and, for this reason, a spring-biased deflector pin (not shown) is positioned adajacent to the path of the strip 40 as it advances to the forming die. The spring-biased deflector pin causes the strip 40 to rise slightly as it approaches the forming die 377, so that the ferrule portions 45—45 of the terminal blanks 41—41 may be seated successively in the forming surface 382 of the forming die 377 as the strip is indexed.

As shown in Fig. 22, the inner side of the guide passage 310 is open along the remaining length thereof beginning at a point immediately before the vertical guide slot 342, so as to permit the end portions of the conductors 31, 32, 33 and 34 to move with their associated terminal blanks 41—41 as the trip 40 is indexed. The guide passage 310 is enlarged slightly adjacent to the forming die 377 to accommodate the slight rise in the strip 40 as it moves past this position. A guide member 390 is provided on the gang die assembly 275 to keep the strip 40 from being bent out of alignment.

After the ferrule position 45 of the leading terminal blank 41 of the strip 40 has been completely and tightly crimped about its respective conductor by the cooperating forming punch 375 and forming die 377, that terminal blank is clipped from the strip 40 at a third station by a clipping punch 400 and cooperating clipping die 402. The clipping punch 400 has a cross section generally trapezoidal in shape, which matches exactly the shape of the intervening portion of the web 42 by which the leading terminal blank 41 is attached to the strip 40. The indexing movement of the feed wheel 315 positions this portion of the web 42 immediately over a matching aperture 404 formed in the clipping die 402 into which the clipping punch 400 moves through a suitable aperture 406 formed in the cover plate 305.

An aligning pin 409 mounted in the gang punch assembly 280 cooperates with a complementary aligning aperture 410 formed in the gang die assembly 275, and serves to align the strip 40 accurately with respect to the clipping punch 400 and clipping die 402. Also mounted on the gang punch assembly 280 is a depending liner pin 411, which enters a liner sleeve 412 mounted in the gang die assembly 275 when the punch and die assemblies are brought together.

Positioned adjacent to the clipping die 402 is an air passage 415 formed in the die plate 402. Intermittent blasts of compressed air are blown through the air passage 415 from a compressed air line 416 to eject the finished terminal 38 and the conductor to which it is attached from the guide passage 310 through the open left hand side thereof, as viewed in Fig. 8.

Projecting laterally from the left hand side of the slide 115, as viewed in Fig. 8, is an arm-like extension 420, which moves with the slide in a shallow longitudinally extending slideway 422 formed in the base housing 62 immediately adjacent to and communicating with the slideway 121. Mounted on the extension 420, in transverse alignment with the stay band forming tool 104 seated in the tool holder 110 of the slide 115, is a cord clip, indicated generally at 424 in Figs. 8 and 25. The cord clip 424 comprises two cooperating spring members 426 and 427 designed to detachably engage a jacketed portion of a cord 30 therebetween.

The extension 420, which moves with the slide 115, is designed to carry a cord 30, detachably engaged by the cord slip 424, into engagement with a cord gripping and transferring conveyor, indicated generally at 430 in Fig. 25. Referring to Fig. 25, the cord gripping and transferring conveyor 430 includes a plurality of links 435—435 pivotally interconnected by pins 437—437 to form an endless chain. The inner ends of the pins 437—437 are engaged slidably on a generally elliptical track 440 defined by the outer edge of a suitably contoured supporting plate 441. The interconnected links 435—435 are free to travel in a counterclockwise direction, as viewed in Fig. 25, but are restrained from moving in the reverse direction by a spring-biased pawl 445.

Each of the links 435—435 is provided with a projection 436—436, provided at both sides with indentations 450—450 and 451—451. When two adjacent links 435—435 occupy positions wherein their respective projections 436—436 are substantially parallel, the contiguous indentations 450 and 451 thereof form a U-shaped opening so as to partially embrace the portion of a cord 30 positioned therebetween. The links 435—435 are moved in the counterclockwise direction when the slide 115 moves to its operative position and the cord 30 carried thereby is pushed against the projection 436 on the endmost of the links. When the slide 115 reaches its operative position, the cord 30 is gripped between the contiguous indentations 450 and 451 of two adjacent links 435—435. As the slide 115 returns to its normal inoperative position, the cord 30 is pulled from the cord clip 424.

*Operation*

Let it be assumed that the motor 87 is energized, that the single-revolution clutch 92 is disengaged, and that the slide 115 is in its normal, inoperative position, as shown in Fig. 8. With the slide 115 in its normal position, the platen 72, which carries the tool holder 100, is in its raised position and the platen 282, which carries the gang punch assembly 280, is in its lower position.

Before a cord 30 is operated on, its jacket 36 is cut away to expose the insulation on the end portions of the individually insulated conductors 31, 32, 33 and 34. Preparatory to the banding and tipping operations to be performed on the cord 30, the operator places a stay band blank 51 in position on the stay band forming tool 104, as shown in Fig. 8. When the stay band blank 51 is properly positioned, its partially formed U-shaped sleeve portion 55 is seated on the complementary rounded forming surface 118 of the stay band forming tool 104 with the sides thereof projecting upwardly.

Next, the operator positions the cord 30 transversely across the slide 115, as shown in Fig. 8, with the individually insulated conductors 31, 32, 33 and 34 arranged coplanarly, side-by-side, on the clamping surface 192 of the shear block 190 and retained in this arrangement by the cooperating nose portion 183 of the spring-pressed clamp 194. Before placing the conductors 31, 32, 33 and 34 on the clamping surface 192 of the shear block 190, it is necessary for the operator to move the clamp 194 to its released position by actuating the knee-operated lever 218, so that the conductors can be inserted between the nose portion 193 of the clamp and the clamping surface.

When the operator releases the knee-operated lever 218 after arranging the conductors 31, 32, 33 and 34 properly, the nose portion 193 of the spring-pressed clamp 194 retains the conductors in this arrangement with a very small amount of pressure. This pressure must not be so great as to prevent the conductors 31, 32, 33 and 34 from being moved sidewise by the tip 227 of the cam-operated pusher 225. As the conductors 31, 32, 33 and 34 of the cord 30 are being positioned properly on the horizontal clamping surface 192, the operator accurately determines the finished lengths of the conductors by utilizing the preselected indicia on the scale 270. The excess end portions are removed by the cutter 255 in the subsequent cutting operation.

The jacketed portion of the cord 30, immediately adjacent to the point at which the jacket 36 is cut away to expose the insulation on end portions of the individually insulated conductors 31, 32, 33 and 34, is positioned by the operator within the partially formed U-shaped sleeve portion 55 of the stay band blank 51, which rests on the rounded forming surface 118 of the stay band forming tool 104. To complete the positioning of the cord 30, the operator engages the transversely extending cord in the cord clip 424 mounted on the extension 420 of the slide 115. The remaining portion of the cord 30 to the left of the cord clip 424, as viewed in Fig. 8, dangles down freely over the left hand edge of the base housing 62.

When the cord 30 and its conductors 31, 32, 33 and 34 are positioned properly, the operator initiates the banding and tipping operations by depressing the foot pedal 94 (Fig. 1) to disengage the spring-biased detent 95, thereby engaging the single-revolution clutch 92 which connects the motor 87 operatively to the cam shaft 85. The motor 87 thereupon operates the cam shaft 85 rotatably through one complete revolution to operate the various cams associated therewith through a complete cycle of 360°.

Immediately after the clutch 92 is engaged to drive the cam shaft 85, the cam 125 (Fig. 1) causes the slide 115 to move rapidly to its operative position against the abutment 134 at the end of the slideway 121. In its operative position the slide 115 positions the tool holder 110 thereof directly beneath the cooperating tool holder 100 carried by the platen 72.

As the slide 115 moves to its operative position, the cord clip 424 on the extension 420 carried by the slide moves the cord 30, which is detachably engaged by the cord clip, into contact with the projection 436 on one of the links 435—435 of the cord gripping and transferring conveyor 430. As the cord 30 is carried forward by the cord clip 424, it urges the interconnected links 435—435 to move in a counterclockwise direction, as viewed in Fig. 25. When the slide 115 reaches its operative position, the cord is gripped and held between the contiguous indentations 450 and 451 of two adjacent parallel projections 436—436 of two adjacent links 435—435.

During the movement of the slide 115 to its operative position, the excess end portions of the conductors 31, 32, 33 and 34 retained in a coplanar arrangement on the horizontal clamping surface 192 of the shear block 190 by the cooperating nose portion 193 of the spring-biased clamp 194, are severed from the conductors along the sharpened edge of the clamping surface by the cutter 255. The cutter 255 is actuated to its cutting position as the slide 115 moves toward its operative position and causes the cam follower 260 to climb the rise on the camming surface 262 of the cam plate 264. The severed excess end portions of the conductors 31, 32, 33 and 34 drop into the scrap opening 258 after the cutting operation.

When the slide 115 reaches its operative position, it is held stationary against the abutment 134 and the leading edge of the clamping surface 192 of the shear block 199 is positioned immediately adjacent to the stepped portion 330 of the guide block 304. In this operative position the clamping surface 192 is substantially flush with the bottom of the horizontal guide slot 335 formed in the guide block 304.

Once the slide 115 reaches its operative position and is stationary, the cam 84 (Fig. 1) causes the ram 70 and platen 72 to move downwardly. The downward movement of the platen 72 carries the stay band forming tool 102 into cooperation with the stay band forming tool 104 to crimp the sleeve portion of the stay band blank 51 tightly about the jacketed portion of the cord 30.

The liner pins 135—135 on the tool holder 100 are received within the liner sleeves 138—138 carried by the tool holder 100 on the slide 115. Thereafter the cam 84 raises the ram 70 slightly to an intermediate position wherein the stay band forming tools 102 and 104 are separated but the ends of the liner pins 135—135 are still received within the liner sleeves 138—138.

With the banding operation completed, the tipping operation commences. The cam 253 (Fig. 1) operates the lever 250 to move the push rod 240, which is now positioned in abutting contact with the striker 251, from right to left, as viewed in Fig. 16. This movement of the push rod 240 advances the tip 227 of the pusher 225 against the coplanarly arranged conductors 31, 32, 33 and 34, thereby urging the conductors sidewise into and along the horizontal guide slot 335 in the guide block 304.

The cam 253 continues to move the tip 227 to the right, as viewed in Fig. 14, and at the end of the horizontal guide slot 235 the leading conductor 31 enters the vertical guide slot 342. Immediately upon entering the vertical guide slot 342, the conductor 31 is engaged by the conductor placing finger 340 moving downwardly with the descending gang punch assembly 280. The gang punch assembly 280 is operated in timed relationship to the movement of the tip 227 of the pusher 225 by the cam 294 which raises and lowers the ram 284 to move the gang punch assembly out of and into cooperation with the gang die assembly 275.

As the conductor placing finger 340 descends, it pushes the conductor 31 downwardly through the vertical guide slot 342 into the U-shaped, ferrule portion 45 of one of the terminal blanks 41—41 of the strip 40, which is prepositioned in the guide passage 310 directly beneath the vertical guide slot. The conductor placing finger 340 urges the engaged conductor 31 into the U-shaped, ferrule portion 45 of the terminal blank 41 with sufficient force to cause the upwardly projecting prongs 47—47 thereof to penetrate the insulation and engage the conductive core of the conductor.

Simultaneously with the placing of the conductor in the U-shaped, ferrule portion 45 of the terminal blank 41 by the conductor placing finger 340, the push rod 368 is operated by the cam 294 (Fig. 1) to move the forming fingers 350—350 upwardly to positions wherein their forming tips 362—362 project through the apertures 360—360. The forming tips 362—362 cooperate with the lower end of the conductor placing finger 340 to crimp the wings 49—49 of the connector blank partially about the conductor 31.

After this precrimping operation has been performed by the conductor placing finger 340 and the cooperating forming tips 362—362, the cam 294 (Fig. 1) again operates the ram 284 to its raised position thereby raising the conductor placing finger in the vertical guide slot 342. Simultaneously, the cam 294 causes the push rod 368 to retract, whereby the forming tips 362—262 of the forming fingers 350—350 resume their inoperative position. Immediately thereafter the cam 317 (Fig. 1) operates the feed wheel 315 to index the strip 40 one step, whereby the terminal blank 41, to which the end of the conductor 31 has been precrimped, is advanced to a position wherein the ferrule portion 45 thereof is seated properly on the forming surface 382 of the forming die 377. This indexing movement of the strip 40 also locates another terminal blank 41 beneath the vertical guide slot 342 with its U-shaped, ferrule portion 45 positioned for receiving the end of the conductor 32.

Immediately following this indexing movement of the strip 40 by the feed wheel 315, the tip 227 of the pusher 225 urges the conductor 32 into the vertical guide slot 342. Simultaneously, the cam 294 moves the ram 284 downwardly for the second time in the cycle to move the gang punch assembly 280 into cooperation with the gang die assembly 275, whereby the conductor placing finger 340 descends through the vertical guide slot 342. The descending conductor placing finger 340 thereupon engages the conductor 32 and carries it downwardly into the U-shaped, ferrule portion 45 of the terminal blank 41 then positioned directly beneath the vertical guide slot 342. As the conductor placing finger 340 urges the conductor into the U-shaped, ferrule portion 45 of the terminal blank 41, the forming tips 362—362 of the forming fingers 350—350 cooperate with the conductor placing finger to crimp the wings 49—49 partially about the conductor 32.

Simultaneously with the precrimping operation being performed on the conductor 32 at the first operating station, the adjacent terminal blank 41 associated with the conductor 31 located at the second operating station has its wings 49—49 crimped completely and tightly about the enclosed end of the conductor by the forming punch 375 and cooperating forming die 377.

Immediately thereafter the cam 294 operates the ram 284 to its raised position to move the gang punch assembly 280 out of cooperation with the gang die assembly 275. Simultaneously the cam 294 causes the push rod 368 to retract whereupon the forming tips 362—362 of the forming fingers 350—350 retract through the apertures 360—360. The cam 317 then operates the feed wheel 115 to index the strip 40 another step, whereby the conductor 31 and leading terminal blank 41, to which it is connected, are advanced to the third operating station. After this indexing movement of the strip 40, the intervening portion of the web 42, which joins the terminal blank 41 to the next adjacent terminal blank, is positioned in matching relationship over the die aperture 404 formed in the clipping die 402. The terminal blank 41, to which the conductor 32 is partly attached, is now located at the second operating station with its ferrule portion 45 seated on the concave forming surface 382 of the forming die 337. This indexing movement also positions another terminal blank 41 directly beneath the vertical guide slot 342 with its U-shaped, ferrule portion 45 arranged to receive the end of the next conductor, the conductor 33.

Upon completion of this indexing operation of the feed wheel 115, the cam 294 again operates the ram 284 to move the gang punch assembly 280 into cooperation with the gang die assembly 275 for the third time in the present cycle. The descending conductor placing finger 340 engages the conductor 33, which has been urged into the vertical guide slot 342 by the tip 227 of the pusher 225, and carries it downwardly into the U-shaped, ferrule portion 45 of the terminal blank 41 then positioned directly under the vertical guide slot. Once again the forming tips 362—362 of the forming fingers 350—350 cooperate with the conductor placing finger 340 to precrimp the wings 49—49 of the ferrule portion 45 of the terminal blank 41 partially about the end of the conductor 33.

This downward movement of the gang punch assembly 280 also moves the forming punch 375 into cooperation with the forming die 377 to perform the final crimping operation on the terminal blank 41 associated with the conductor 32, which is positioned at the second operating station. Simultaneously the leading terminal blank 41, to which the end of the conductor 31 is attached, is severed from the strip 40 by the clipping punch 400 and cooperating clipping die 402. The clipping punch 400 moves downwardly with the gang punch assembly 270 to blank out the intervening portion of the web 42 connecting the leading terminal blank 41 to the strip 40.

Immediately thereafter the cam 294 operates the ram 284 to its raised position and the cam 317 then operates the feed wheel 315 to index the strip 40 one step, thereby advancing the terminal blank 41 to which the end of the conductor 33 has been precrimped, to the second operating station where it is positioned on the forming surface 382 of the forming die 377. This indexing movement of the strip 40 also moves the leading terminal blank 41 to which the end of the conductor 32 is attached, to the third operating station, the portion of the web 42 connecting that terminal blank to the strip 40 being positioned over the matching aperture 404 formed in the clipping die.

After the last-described indexing movement, the cam 294 operates the ram 284 downwardly for the fourth and final time in the cycle. As the ram 284 moves downwardly carrying the gang punch assembly 280 into cooperation with the gang die assembly 275, the descending conductor placing finger 340 engages the conductor 34, which has been urged into the vertical guide slot 342 by the tip 227 of the moving pusher 225, and carries it downwardly into the U-shaped, ferrule portion 45 of a terminal blank 41 then positioned directly under the vertical guide slot. Again the forming tips 363—362 of the forming fingers 350—350 cooperate with the conductor placing finger 340 to precrimp the wings 49—49 of the terminal blank 41 partially about the end of the conductor 34. Simultaneously with the precrimping operation performed on the conductor 34, the forming punch 375 and cooperating forming die 377 perform the final crimping operation on the conductor 33, and the clipping punch 400 and cooperating clipping die 402 sever the leading terminal blank 41, which has been completely formed and attached to the end of the conductor 32, from the strip 40. Thereafter, the ram 284 remains in its lowered position for the remainder of the cycle of the cam shaft 85.

After the gang punch assembly 280 has been moved downwardly into cooperation with the gang die assembly 275 for the fourth and final time in the 360° cycle of the cam shaft 85, the ram 70 is moved to its raised position by the cam 84 and remains in this position for the remainder of the cycle. However, before the ram 70 resumes its raised position, the cam 173 operates the slidable rack 157 to move it rapidly to the left. This movement of the rack 157 actuates the ejector arm 145 to cause it to pivot in a counterclockwise direction, as viewed in Fig. 10, whereby it ejects the stay band 50, which is now tightly crimped about the jacket portion of the cord 30 from its position of the stay band forming tool 104.

Now that the ram 70 is in its raised position and the liner pins 135—135 are withdrawn from the liner sleeves 138—138, the slide 115 is returned to its normal inoperative position by the cam 125. The movement of the slide 115 to its normal inoperative position is the final operation in the cycle of the cam shaft 85 and immediately thereafter the clutch 92 becomes disengaged. At the end of the cycle, the ram 284 is in its lowered position and the gang punch assembly 280 is in cooperating engagement with the gang die assembly 275.

As the slide 115 returns to its normal position at the end of the cycle, the cord 30 becomes disengaged from the cord clip 424 by virtue of the fact that it is gripped and held between the contiguous indentations 450 and 451 of two adjacent links 435—435 of the cord gripping and transferring conveyor 330. Since the interconnected links 435—435 are not free to move in a clockwise direction, as viewed in Fig. 25, the cord 30 is pulled from the cord clip 424, in which it is detachably engaged.

At the completion of the single revolution cycle of the cam shaft 85, only two conductors, conductors 31 and 32, have been finished, that is, provided with completely attached, individual terminals 38—38. The conductors 33 and 34 are attached to adjacent terminal blanks 41—41 which are still connected to each other and the strip 40 by the web 42. The tipping of the conductors 33 and 34 is completed during the next operating cycle of the apparatus, during which two conductors of another cord are also finished. The subsequent operating cycles of the apparatus are identical to that hereinabove described.

It will be understood that the above-described apparatus is only an exemplary embodiment of the invention, and that various modifications thereof may be made within the spirit and scope of the invention.

What is claimed is:

1. Article assembling apparatus for attaching terminals to individually insulated conductors of a multiconductor cord, which comprises means for retaining the several conductors of a cord initially aligned in coplanar relationship, means for feeding terminals having conductor engaging portions successively along a predetermined path adjacent to said conductor retaining means, means operated in timed relation to the terminal feeding means for pushing the conductors individually and successively from the conductor retaining means, and means operated in timed relation to said pushing means for inserting the released conductors individually and successively into engagement with the conductor engaging portions of successive terminals.

2. Article assembling apparatus for attaching terminals to individually insulated conductors of a multiconductor cord, which comprises means for retaining the several conductors of a cord initially aligned in coplanar relationship, means for feeding terminals having conductor engaging portions successively along a predetermined path adjacent to said conductor retaining means, means operated in timed relation to the terminal feeding means for pushing the conductors individually and successively from the conductor retaining means, means operated in timed relation to said pushing means for inserting the released conductors individually and successively into engagement with the conductor engaging portions of successive terminals, and means for crimping the conductor engaging portions of the terminals about their respective conductors.

3. Article assembling apparatus for attaching terminals to the individually insulated conductors of a multiconductor cord, which comprises means for retaining exposed end portions of the several conductors of a multiconductor cord initially in a side-by-side coplanar relationship, means for guiding a strip of equally spaced interconnected terminals having partially preformed conductor-engaging portions along a predetermined path of travel in transverse alignment with the end portions of the conductors, means for indexing the strip to position the individual terminals successively adjacent to the conductor retaining means, means cooperating with said indexing means for pushing the end portions of conductors individually and successively from the conductor retaining means, means operated in timed relation to said pushing means for inserting the released end portions of the conductors individually and successively into the conductor-engaging portions of successive terminals, and means for forming said conductor-engaging portions about the ends of the respective conductors.

4. Article assembling apparatus for attaching solderless terminals to the individually insulated conductors of a multiconductor cord, which comprises clamping means for retaining exposed end portions of the several conductors of a multiconductor cord initially in a side-by-side coplanar relationship, means for guiding a strip of equally spaced, interconnected terminals having partially preformed conductor-engaging portions along a predetermined path of travel in transverse alignment with said end portions of the conductors, means operated intermittently for indexing the strip to position the terminals successively adjacent to the conductor clamping means, means operated in timed relation to said indexing means for pushing the end portions of said conductors individually and successively from the conductor clamping means, means operated in timed relation to said pushing means for inserting the unclamped end portions individually and successively into the preformed conductor-engaging portions of successive terminals, and means for completely forming the partially preformed conductor-engaging portions about the ends of the respective conductors.

5. Article assembling apparatus for attaching solderless terminals to the individually insulated conductors of a multiconductor cord, which comprises a spring pressed clamp for releasably clamping exposed end portions of the several conductors of a multiconductor cord initially in a side-by-side coplanar relationship, means for guiding a strip of equally spaced, interconnected terminals having partially preformed conductor-engaging portions along a predetermined path of travel in transverse alignment with the clamped end portions of the conductors, means operated intermittently for indexing the strip to position the terminals successively adjacent to the clamp, means operated in timed relation to the indexing means for pushing the end portions of conductors individually and successively from the clamp, means operated in timed relation to the pushing means for inserting the unclamped end portions individually and successively into the conductor-engaging portions of successive terminals, means for crimping the partially preformed conductor-engaging portions about the ends of the respective conductors, and means for successively severing the terminals from the strip after they have been attached to their respective conductors.

6. Article assembling apparatus for attaching solderless terminals to the individually insulated conductors of a multiconductor cord, which comprises a spring pressed clamp for releasably clamping exposed end portions of the several conductors of a multiconductor cord initially in a side-by-side coplanar arrangement, means for guiding a plurality of terminals having U-shaped conductor-engaging portions along a predetermined path aligned with the clamped end portions of the conductors, means for intermittently feeding the terminals successively to a position immediately adjacent to the spring pressed clamp, a pusher operated in timed relation to the terminal feeding means for disengaging the conductors individually and successively from the clamp, and a conductor placing finger operated in timed relation to the pusher for inserting the end portions of the disengaged conductors into the U-shaped conductor engaging portions of successive terminals.

7. Article assembling apparatus for assembling terminals on the ends of a plurality of electrical conductors of a multiconductor telephone cord, which comprises a vertically movable gang punch assembly, a stationary gang die assembly mounted for cooperation with the gang punch assembly, said die assembly having a guideway formed longitudinally therein through which a strip of interconnected, equally spaced, terminals provided with partially preformed, U-shaped, conductor-engaging portions may be advanced, a slide reciprocal in a horizontal direction, means for retaining the end portions of the several conductors of a multiconductor cord initially in side-by-side, coplanar relationship, said conductor retaining means being mounted on the slide for movement therewith into and out of operative relation with the stationary gang die assembly, means operated when the slide and associated conductor retaining means are in operative relation with the gang die assembly for pushing the end portions of the conductors individually and successively from the conductor retaining means, a conductor placing finger mounted on the vertically movable gang punch assembly and operated in timed relationship with respect to the conductor pushing means for engaging successively the end portions of the conductors and inserting them into the U-shaped, conductor-engaging portions of successive terminals, means operated in timed relationship with respect to the conductor placing member for intermittently indexing the strip, and means provided on the cooperating punch and die assemblies and designed to form the U-shaped, conductor-engaging portions of the terminals tightly about the ends of the respective conductors.

8. Article assembling apparatus for assembling terminals on the ends of a plurality of electrical conductors of a multiconductor telephone cord, which comprises a vertically movable gang punch assembly, a stationary gang die assembly mounted for cooperation with the gang punch assembly, said die assembly having a guideway formed longitudinally therein through which a strip of interconnected, equally spaced, terminals provided with partially preformed, U-shaped, conductor-engaging portions may be advanced to a series of operating stations, a slide reciprocal in a horizontal direction, a spring pressed clamp for releasably holding end portions of the several conductors of a multiconductor cord aligned and in coplanar relationship, the clamp being mounted on the slide for movement therewith into and out of operative relation with the stationary gang die assembly, means operated when the slide and clamp are in operative relation with the gang die assembly for pushing the end portions of the conductors individually and successively from the clamp, a conductor placing finger mounted on the vertically movable gang punch assembly and operated in timed relationship with respect to the conductor pushing means for engaging successively the end portions of the conductors and inserting them into the U-shaped, conductor-engaging portions of successive terminals, means operated in timed relationship with respect to the conductor placing finger for intermittently indexing the strip, and cooperating punch and die elements mounted on the punch and die assemblies and designed to progressively crimp the conductor-engaging portions of the terminals tightly about the ends of the respective conductors and sever the terminals after they are attached to their respective conductors from the remainder of the strip, the ends of the conductors inserted in the conductor-engaging portions of their respective terminals being transported between the cooperating punch and die elements by the intermittent indexing movement of the strip.

9. Article assembling apparatus for assembling terminals on the ends of a plurality of electrical conductors of a multiconductor telephone cord, which comprises a vertically movable gang punch assembly, a stationary gang die assembly mounted for cooperation with the gang punch assembly, said die assembly having a guideway formed longitudinally therein through which a strip of interconnected, equally spaced, terminals provided with partially preformed, U-shaped, conductor-engaging portions may be advanced to a series of operating stations, a slide reciprocal in a horizontal direction, spring pressed clamping means provided with flat cooperating clamping surfaces designed to releasably retain the end portions of the several conductors of a multiconductor cord in side-by-side, coplanar relationship, said conductor clamping means being positioned on the slide for movement therewith into and out of operative relation with the stationary gang die assembly, an elongated pusher member slidably mounted between the cooperating clamping surfaces and operated when the slide and associated conductor clamping means are in operative relation with the gang die assembly to push the end portions of the conductors individually and successively from between the cooperating clamping surfaces, a conductor placing finger mounted on the vertically movable gang punch assembly and operated in timed relation to the conductor pushing means for engaging successively the released end portions of the conductors and inserting them into the partially preformed, U-shaped, conductor-engaging portions of successive terminals, means operated intermittently in timed relation to the conductor placing finger for indexing the strip, and cooperating punch and die elements mounted on the punch and die assemblies and designed to progressively crimp the U-shaped, conductor-engaging portions of the terminals tightly about the ends of the respective conductors and finally sever the terminals attached to their respective conductors from the remainder of the strip, the ends of the conductors being transported between the cooperating punch and die elements by the intermittent indexing movement of the strip.

10. Article assembling apparatus for assembling terminals on the ends of a plurality of electrical conductors of a multiconductor telephone cord, which comprises a vertically movable gang punch assembly, a stationary gang die assembly mounted for cooperation with the gang punch assembly, said die assembly having a guideway formed longitudinally therein through which a strip of interconnected, equally spaced, terminals provided with partially formed conductor-engaging ferrule portions may be advanced to a series of operating stations, a slide reciprocal in a horizontal direction, clamping means mounted on the slide for movement therewith into and out of operative relation with the stationary gang punch assembly for retaining the end portions of the several conductors of a multiconductor cord in side-by-side, coplanar relationship, means operative when the slide and clamping means are in operative relation to the gang punch assembly for pushing the end portion of the conductors individually and successively from the conductor retaining means, a conductor placing finger mounted on the vertically movable gang punch assembly and operated in timed relationship with respect to the conductor pushing means for engaging successively the released end portions of the conductors and inserting them into the preformed conductor-engaging ferrule portions of successive terminals, means operated intermittently in timed relationship with respect to the conductor placing finger for indexing the strip, and a pair of spring pressed fingers designed to cooperate with the conductor placing finger to crimp the ferrule portion of the terminal about the end of the respective conductor, and means for severing the terminals attached to their respective conductors from the remainder of the strip.

11. In article assembling apparatus for attaching terminals to the exposed ends of a plurality of individually insulated conductors of a multiconductor electrical cord including relatively movable punch and die members, means for operating the punch and die members into and out of cooperation with each other and means for feeding terminals successively between the cooperating punch and die members, the improvement which comprises means for retaining the end portions of the several conductors of the cord initially in a coplanar arrangement, means operated in timed relation to the terminal feeding means for pushing the end portions of the conductors individually and successively from the conductor retaining means, and means operated in timed relation to said pushing means for inserting the released end portions individually and successively into engagement with successive terminals, whereby the cooperating punch and die members attach the terminals to the conductors.

12. In article assembling apparatus for attaching solderless terminals to the exposed ends of a plurality of individually insulated electrical conductors of a multiconductor telephone cord, including a movable gang punch assembly, a stationary gang die assembly having a guideway formed longitudinally therein, means for operating the gang punch assembly into and out of cooperation with the gang die assembly, and means operated intermittently in timed relation to the gang punch assembly operating means for indexing along the guideway formed in the gang die assembly a strip of interconnected, equally spaced, terminals provided with partially preformed ferrule portions, the improvement which comprises clamping means for retaining the exposed end portions of the several conductors of the cord initially in a side-by-side coplanar relationship and in transverse alignment with the guideway in the gang die assembly, means operated in timed relation to the gang punch assembly operating means for pushing the end portions of the conductors individually and successively from the conductor clamping means, and means operated in timed relation to said pushing means for inserting the unclamped end portions individually and successively into the preformed ferrule portions of successive terminals, whereby the cooperating gang punch assembly and gang die assembly form the ferrule portions of the terminals about their respective conductors.

13. In article assembling apparatus for attaching solderless terminals to the exposed ends of a plurality of individually insulated electrical conductors of a multiconductor telephone cord, including a movable gang punch assembly, a stationary gang die assembly having a guideway formed longitudinally therein, means for operating the gang punch assembly into and out of cooperation with the gang die asesmbly, and means operated intermittently in timed relation to the gang punch assembly operating means for indexing along the guideway formed in the gang die assembly a strip of interconnected, equally spaced, terminals provided with partially preformed ferrule portions, the improvement which comprises spring pressed clamping means having substantially flat cooperating clamping surfaces for releasably retaining the exposed end portions of the several individually insulated conductors of the cord initially in a side-by-side coplanar relationship and in transverse alignment with the guideway formed in the gang die assembly, a pusher slidably mounted between the cooperating clamping surfaces of the clamping means and operated in timed relation to the gang punch assembly operating means for forcing the end portions of the conductors individually and successively from between cooperating clamping surfaces of the conductor clamping means, and a conductor placing finger mounted on the gang punch assembly for engaging successively the released end portions of the conductors and inserting them into the partially preformed ferrule portions of successive connectors of the strip whereupon the cooperating gang punch assembly and gang die assembly form the ferrule portions of the connectors progressively about their respective conductors.

14. Apparatus for cutting the several electrical conductors of a multiconductor telephone cord to predetermined lengths and for attaching solderless terminals on the ends of said conductors, which comprises a vertically movable gang punch assembly, a stationary gang die assembly mounted for cooperation with the gang punch assembly, said die assembly having a guideway formed longitudinally therein through which a strip of interconnected, equally spaced, terminals provided with partially preformed U-shaped conductor-engaging portions may be advanced, a slide reciprocally mounted for horizontal movement, means for detachably clamping the end portions of the several conductors of the cord in side-by-side, coplanar relationship, said clamping means being mounted on the slide for movement therewith into and out of operative relation with the stationary gang die assembly, a cutter pivotally mounted on the slide adjacent to the conductor clamping means, cam means mounted adjacent to the slide for operating the cutter as the slide moves to its operative position to sever predetermined excess portions from the ends of the conductors, means operated when the slide and associated conductor clamping means reach the operative position for pushing the end portions of the conductors individually and successively from the conductor clamping means, a conductor placing finger mounted on the vertically movable gang punch assembly for cooperation with the conductor pushing means for engaging successively the end portions of the conductors and inserting them individually into the U-shaped conductor-engaging portions of successive terminals of the strip, means operated in timed relationship with respect to the conductor placing member for intermittently indexing the strip, and means provided on the punch and die assemblies for forming the U-shaped, conductor-engaging portions of the terminals tightly about the ends of the respective conductors.

15. In apparatus for assembling terminals on the ends of a plurality of electrical conductors of a unitary multiconductor cord, including a slide movable reciprocably longitudinally in a horizontal direction into and out of an operative relation to a punch and die means, and means mounted on the slide and operable when the slide is in said operative relation for placing the ends of the conductors in the terminals, said punch and die means being designed to secure terminals to the ends of individual conductors of the cord when the slide is in said operative relation, the improvement which comprises cord-gripping means mounted on the slide for securing the cord detachably to the slide in transverse horizontal alignment for movement therewith into said operative relation, a plurality of interconnected links forming an endless flexible chain movable longitudinally in a direction substantially perpendicular to the cord positioned on the slide, said links beng provided with outwardly extending projections having complementary indentations which form substantially U-shaped cord-receiving openings between the contiguous sides of the projections on each pair of adjacent links when said projections are substantially parallel to each other, means for moving the slide into its operative relation to the punch and die means and for thrusting the cord positioned thereon sidewise against the projection on one of the links to move the said last-mentioned link in a forward direction away from the slide whereby the next successive link of the chain is moved into a position such that its projection is parallel to the projection against which the cord was thrust and the cord is engaged in the opening formed by the complementary indentations thereon, means for moving the slide out of said operative relation, and means for preventing the movement of the links in a reverse direction whereby the engaged cord is pulled from the cord-gripping means on the slide as the latter moves out of said operative relation.

16. Article assembling apparatus for attaching terminals to exposed end portions of conductors of a unitary, multiconductor cord, which comprises a slide mounted reciprocably for longitudinal movement into and out of an operative position, cord-gripping means mounted on the slide for detachably securing a unitary, multiconductor cord upon the slide in a horizontal, transversely aligned position for movement therewith, means mounted on the slide for detachably retaining exposed end portions of the several conductors of the cord initially in a side-by-side coplanar relationship, means for feeding successively terminals having conductor-engaging portions along a predetermined path adjacent to said conductor retaining means when the slide is in its operative position, means operated in timed relationship with the terminal feeding means for pushing the conductors individually and successively from the conductor retaining means, means operated in timed relation to said pushing means for inserting the released conductors individually and successively into engagement with the conductor-engaging portions of successive terminals, means for securing the terminals to the ends of the conductors while the slide is in said operative position, and cord transferring means for engaging the cord when the slide moves into its operative position and for pulling the cord from the cord-gripping means when the slide moves out of said operative position after the end portions of the conductors have been pushed from the conductor retaining means.

References Cited in the file of this patent

UNITED STATES PATENTS

| | | |
|---|---|---|
| 2,396,913 | Carlson | Mar. 19, 1946 |
| 2,409,147 | Neuhaus et al. | Oct. 8, 1946 |
| 2,551,376 | Hroch | May 1, 1951 |
| 2,592,276 | Hackbarth | Apr. 8, 1952 |
| 2,631,213 | Martines | Mar. 10, 1953 |
| 2,684,421 | Hipple | July 20, 1954 |